Inventor
Sidney J. Finn
By his Attorney

Inventor
Sidney J. Finn
By his Attorney

Inventor
Sidney J. Finn
By his Attorney

March 21, 1961

S. J. FINN 2,975,678

GUN-LOADING MECHANISMS

Filed March 20, 1946

Inventor
Sidney J. Finn
By his Attorney

Inventor
Sidney J. Finn
By his Attorney

March 21, 1961    S. J. FINN    2,975,678
GUN-LOADING MECHANISMS
Filed March 20, 1946    22 Sheets-Sheet 8

Inventor
Sidney J. Finn
By his Attorney

March 21, 1961 S. J. FINN 2,975,678
GUN-LOADING MECHANISMS

Filed March 20, 1946 22 Sheets-Sheet 9

Inventor
Sidney J. Finn
By his Attorney

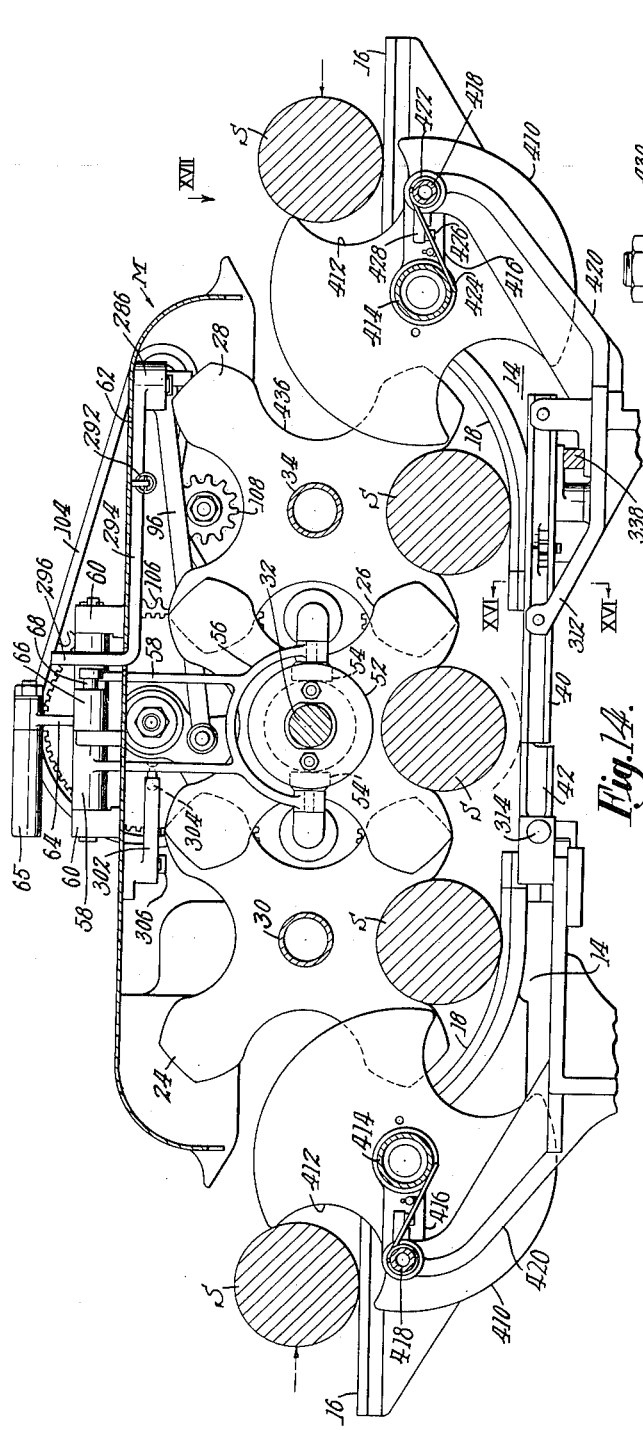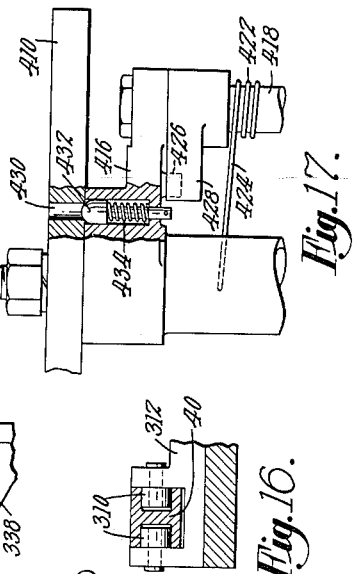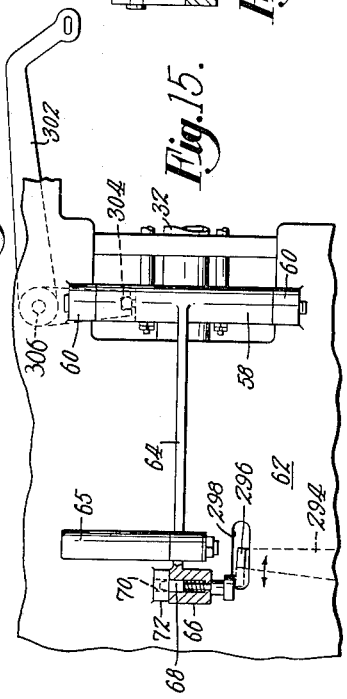

March 21, 1961  S. J. FINN  2,975,678
GUN-LOADING MECHANISMS
Filed March 20, 1946  22 Sheets-Sheet 11
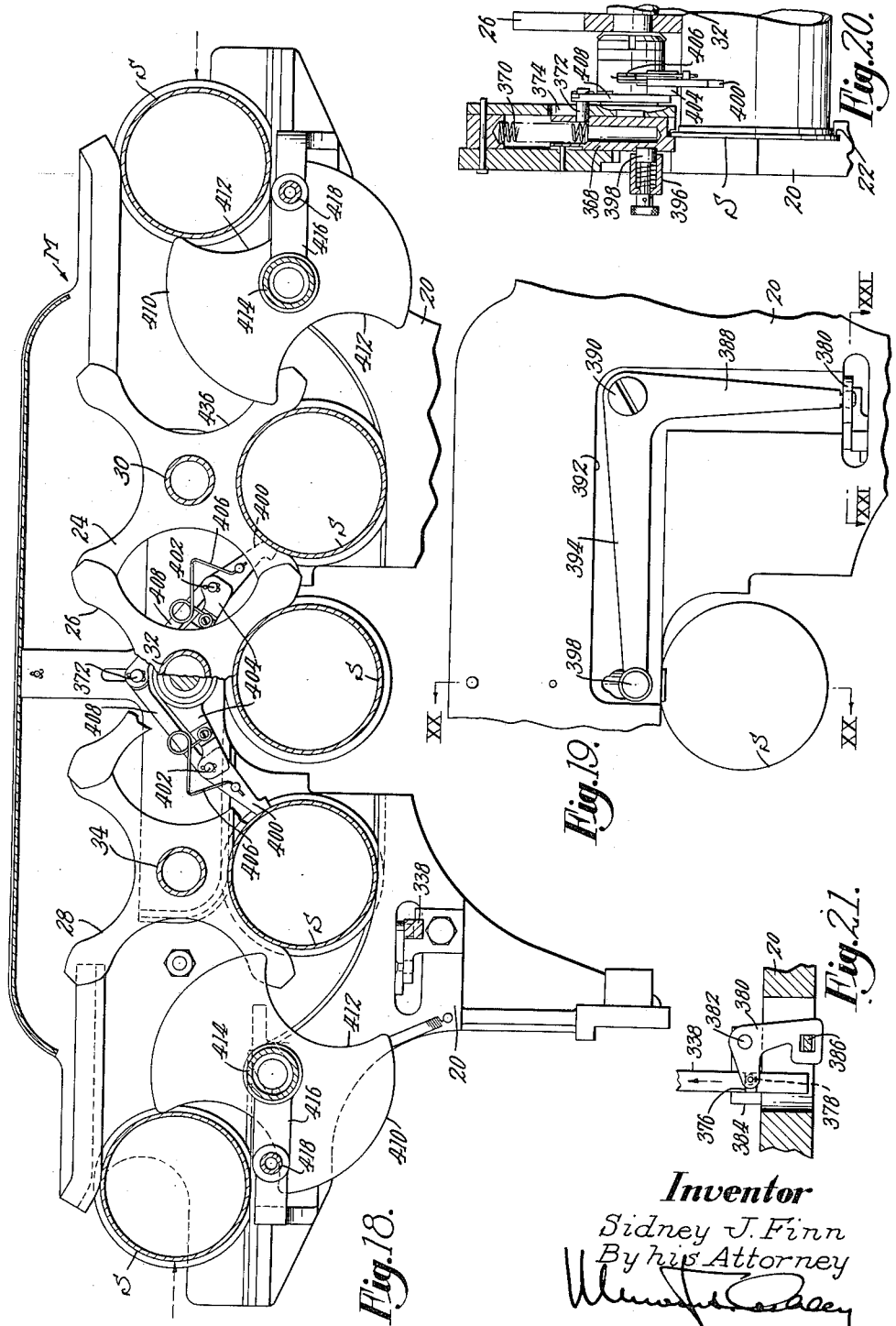
Inventor
Sidney J. Finn
By his Attorney

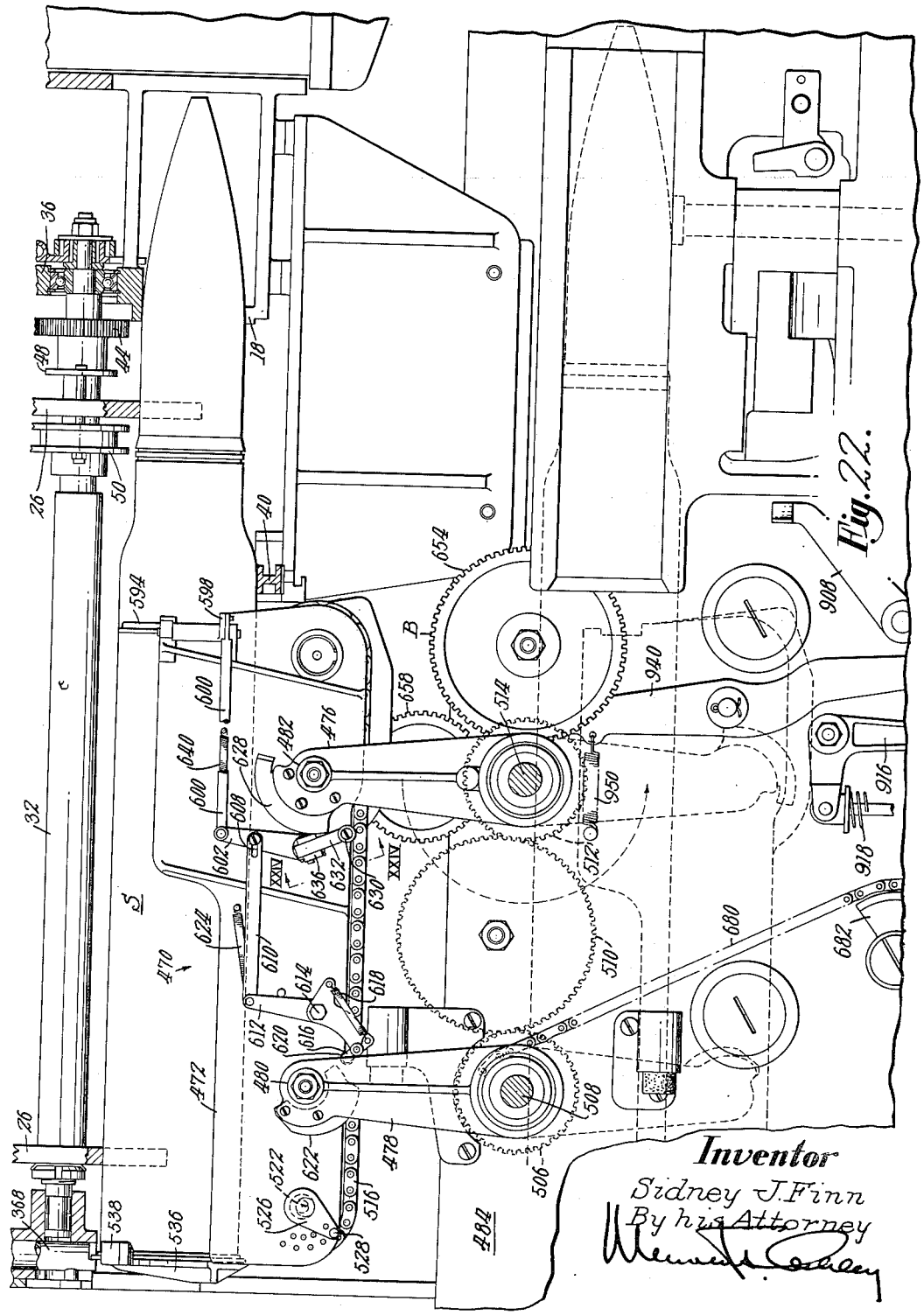

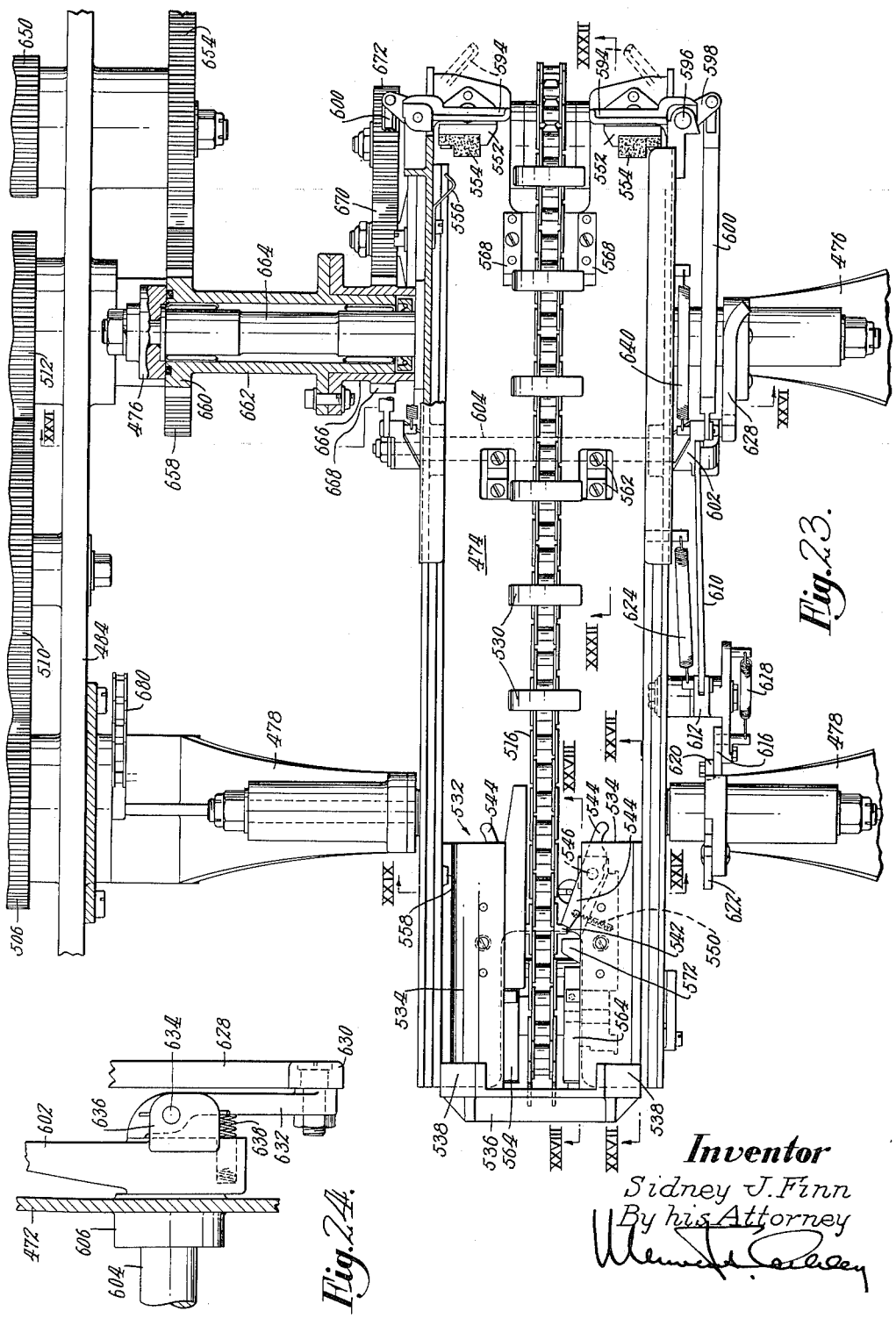

March 21, 1961  S. J. FINN  2,975,678
GUN-LOADING MECHANISMS
Filed March 20, 1946  22 Sheets-Sheet 14

Inventor
Sidney J. Finn
By his Attorney

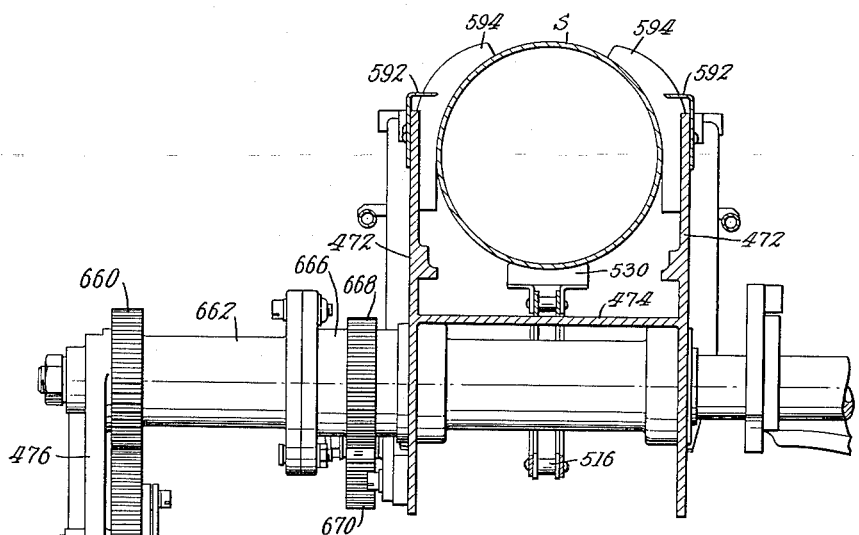
Fig. 26.
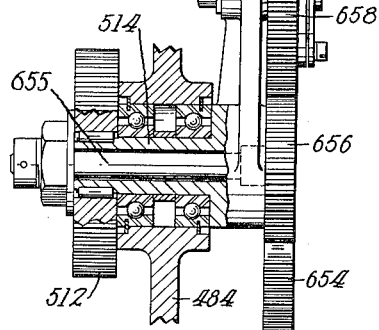
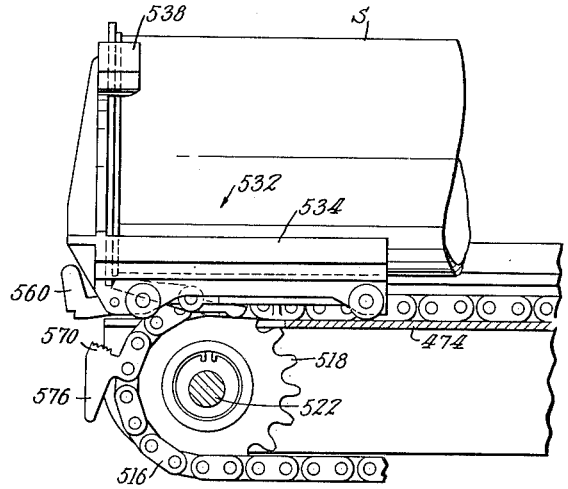
Fig. 27.
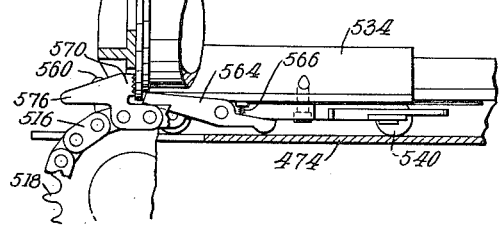
Fig. 28.
Inventor
Sidney J. Finn
By his Attorney March 21, 1961 S. J. FINN 2,975,678
GUN-LOADING MECHANISMS
Filed March 20, 1946 22 Sheets-Sheet 16

Inventor
Sidney J. Finn
By his Attorney

March 21, 1961  S. J. FINN  2,975,678
GUN-LOADING MECHANISMS
Filed March 20, 1946  22 Sheets-Sheet 17
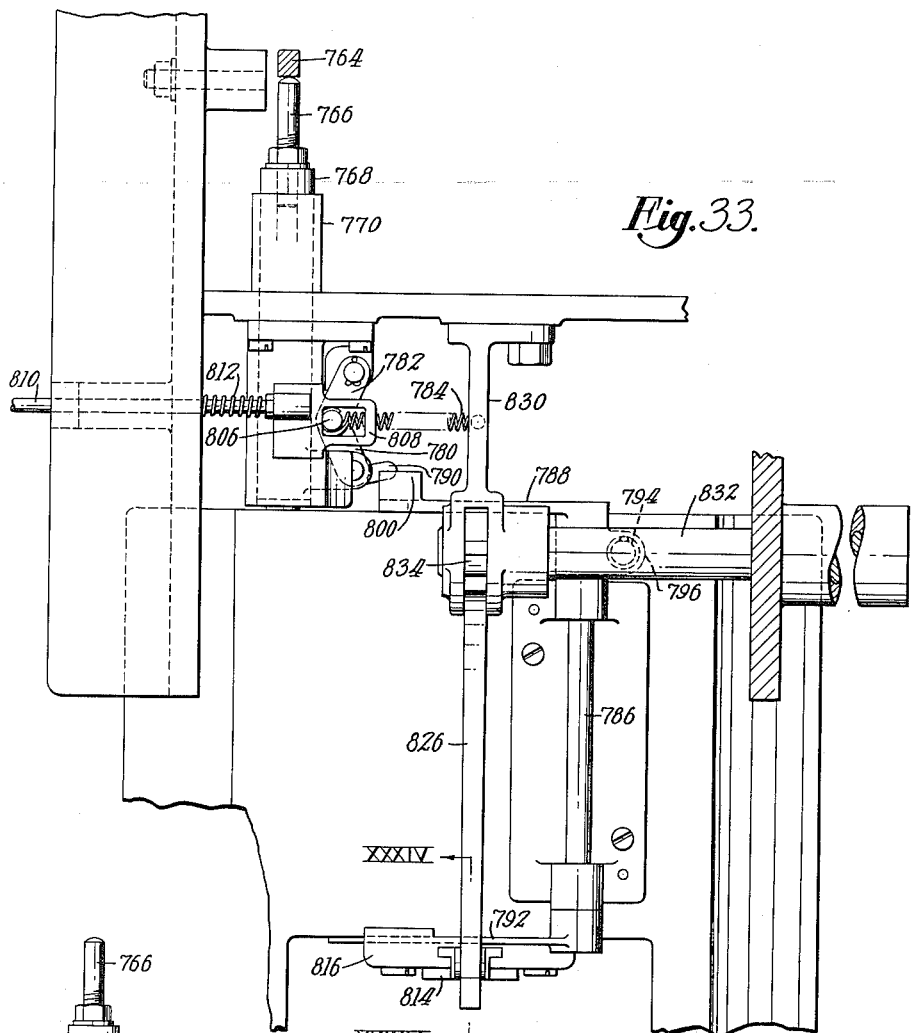
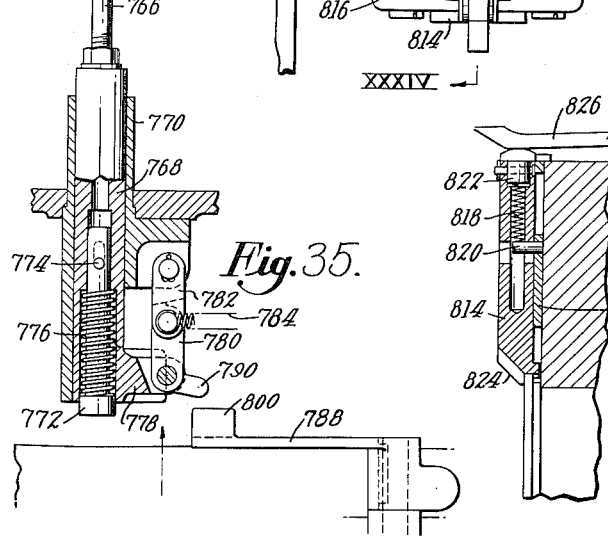
Inventor
Sidney J. Finn
By his Attorney Inventor
Sidney J. Finn
By his Attorney March 21, 1961 S. J. FINN 2,975,678
GUN-LOADING MECHANISMS
Filed March 20, 1946 22 Sheets-Sheet 19
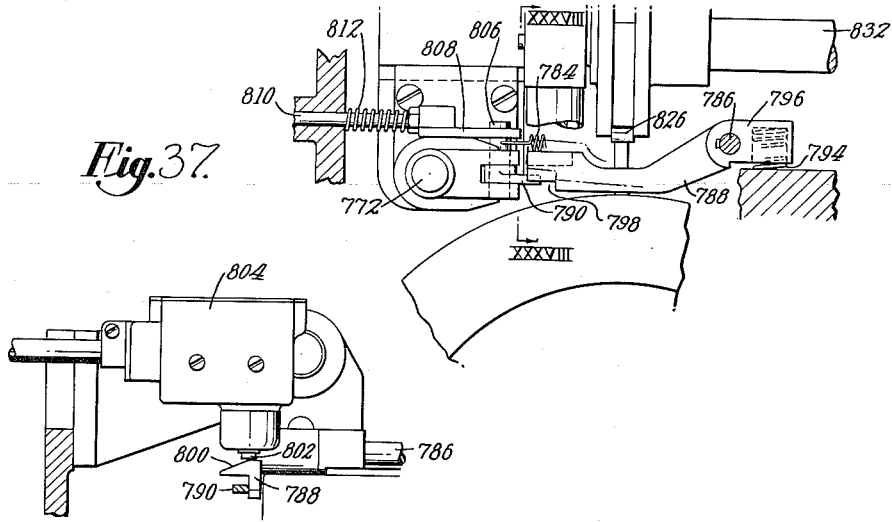
Fig. 37.
Fig. 38.
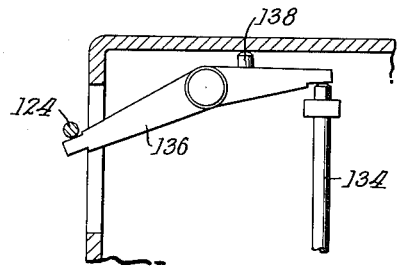
Fig. 39.
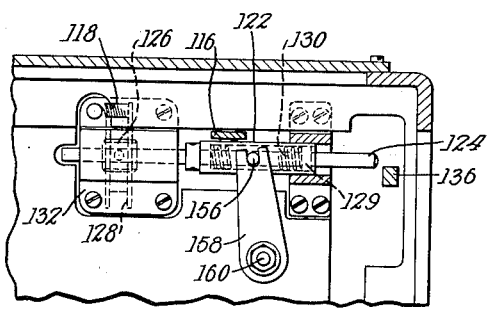
Fig. 40.
*Inventor*
Sidney J. Finn
By his Attorney March 21, 1961  S. J. FINN  2,975,678
GUN-LOADING MECHANISMS
Filed March 20, 1946  22 Sheets-Sheet 21

*Inventor*
Sidney J. Finn
By his Attorney

March 21, 1961 S. J. FINN 2,975,678
GUN-LOADING MECHANISMS
Filed March 20, 1946 22 Sheets-Sheet 22

Inventor
Sidney J. Finn
By his Attorney

United States Patent Office 2,975,678
Patented Mar. 21, 1961

2,975,678

GUN-LOADING MECHANISMS

Sidney J. Finn, Beverly, Mass., assignor to United Shoe Machinery Corporation, Flemington, N.J., a corporation of New Jersey Filed Mar. 20, 1946, Ser. No. 655,704

6 Claims. (Cl. 89—45)

This invention relates to ordnance and more particularly to loading mechanisms for guns of large caliber. An object of the present invention is to provide an improved loading mechanism for guns of large caliber which will enable such guns to be operated at a higher rate of fire than heretofore.

To this end and in accordance with a feature of the invention, the shells to be loaded are supplied from a magazine in which the shells are located side by side and parallel to the axis of the gun. Provision is made for feeding the shells alternately from opposite sides of the magazine toward the center from which the shells are withdrawn and transferred into the gun. The magazine is designed to be maintained loaded during the operation of the gun by two operators one at each side thereof who will replenish the shells as they are used. It may happen that only one operator is available and consequently it is desirable to feed a shell from the same side of the magazine each time. Accordingly, provision is made, in accordance with another feature of the invention, for so controlling the feeding mechanism that the shells may be fed alternately from opposite sides or always from the same side of the magazine. The shells are fed by sprockets in the magazine and while the shells are being fed from one side the sprockets at the other side are locked aginst movement, this locking means being controlled by the feeding means so that the shells are positively held in proper position within the magazine.

As illustrated herein the magazine is mounted on the gun carriage above the breech end thereof and extends forwardly of the breech end of the gun. In order to load the gun with the greatest possible speed and in accordance with a further feature of the invention the shells are carried into ramming position by a transfer tray which moves rearwardly and downwardly from its shell-receiving position and then forwardly. It is necessary that the shell also be moved forwardly relatively to the transfer tray and accordingly the tray is provided, in accordance with a still further feature of the invention, with an improved chain rammer mechanism which begins to move the shell forwardly of the tray during the downward movement of the tray. At the conclusion of the downward movement of the tray the chain is moving at its maximum speed and catapults the shell into the breech of the gun. The chain carries a plurality of members for supporting the forward and central portions of the shell and a carriage is releasably connected thereto and supports the rearward end of the shell. This carriage has a vertical portion engageable with the back end of the shell and pushes the shell forwardly in response to movement of the carriage by the chain. When the carriage reaches the forward end of the tray it is automatically disconnected from the chain which, however, continues to move and a shell-engaging member carried thereby catapults the shell into the gun.

The gun illustrated herein is of the type having a sliding breechblock closed under the action of a spring when a locking member is released in response to movement of shell ejector fingers by the engagement therewith of the flange of the shell in loading the gun. Because of the speed with which the transfer tray moves in loading the gun, vibrations are set up which in the absence of suitable mechanism might cause release of the locking member whereupon the breechblock would close prematurely. In accordance with another feature of the invention means are provided for positively preventing closure of the breechblock until the transfer tray has reached its lowermost position. This means, however, may be rendered ineffective by the operator with the loading tray in its uppermost position should it be desired to load the gun manually.

In accordance with another feature of the invention, various safety devices are provided for preventing malfunctioning of the apparatus. Among these is a lock which prevents engagement of a clutch in the drive to the loading mechanism in the event that the gun is not in battery and that the breechblock is not open and the breech clear for the reception of a shell.

The above and other features of the invention, including various details of construction and novel combinations of parts, will now be described by reference to the accompanying drawings and pointed out in the claims.

In the drawings,

Fig. 14 is a section on the line XIV—XIV of Fig. 3;

Fig. 15 is a plan view partly in section of a part of the magazine control mechanism;

Fig. 16 is a section on the line XVI—XVI of Fig. 14;

Fig. 17 is a view partly in section looking in the direction of the arrow XVII of Fig. 14;

Fig. 18 is a section on the line XVIII—XVIII of Fig. 3;

Fig. 19 is a front elevation of the mechanism for operating the rear shell-supporting gate;

Fig. 20 is a section on the line XX—XX of Fig. 19;

Fig. 21 is a section on the line XXI—XXI of Fig. 19;

Fig. 22 is a right side elevation of the loading tray and its operating mechanism;

Fig. 23 is a plan view partly in section of the loading mechanism;

Fig. 24 is a section on the line XXIV—XXIV of Fig. 22;

Fig. 26 is a section on the line XXVI—XXVI of Fig. 23;

Fig. 27 is a section on the line XXVII—XXVII of Fig. 23;

Fig. 28 is a section on the line XXVIII—XXVIII of Fig. 23;

Fig. 33 is a section on the line XXXIII—XXXIII of Fig. 25;

Fig. 34 is a section on the line XXXIV—XXXIV of Fig. 33;

Fig. 35 is a section on the line XXXV—XXXV of Fig. 8;

Fig. 37 is a section on the line XXXVII—XXXVII of Fig. 36;

Fig. 38 is a section on the line XXXVIII—XXXVIII of Fig. 37;

Fig. 39 is a section on the line XXXIX—XXXIX of Fig. 2;

Fig. 40 is a section on the line XL—XL of Fig. 2;

Figure 1:
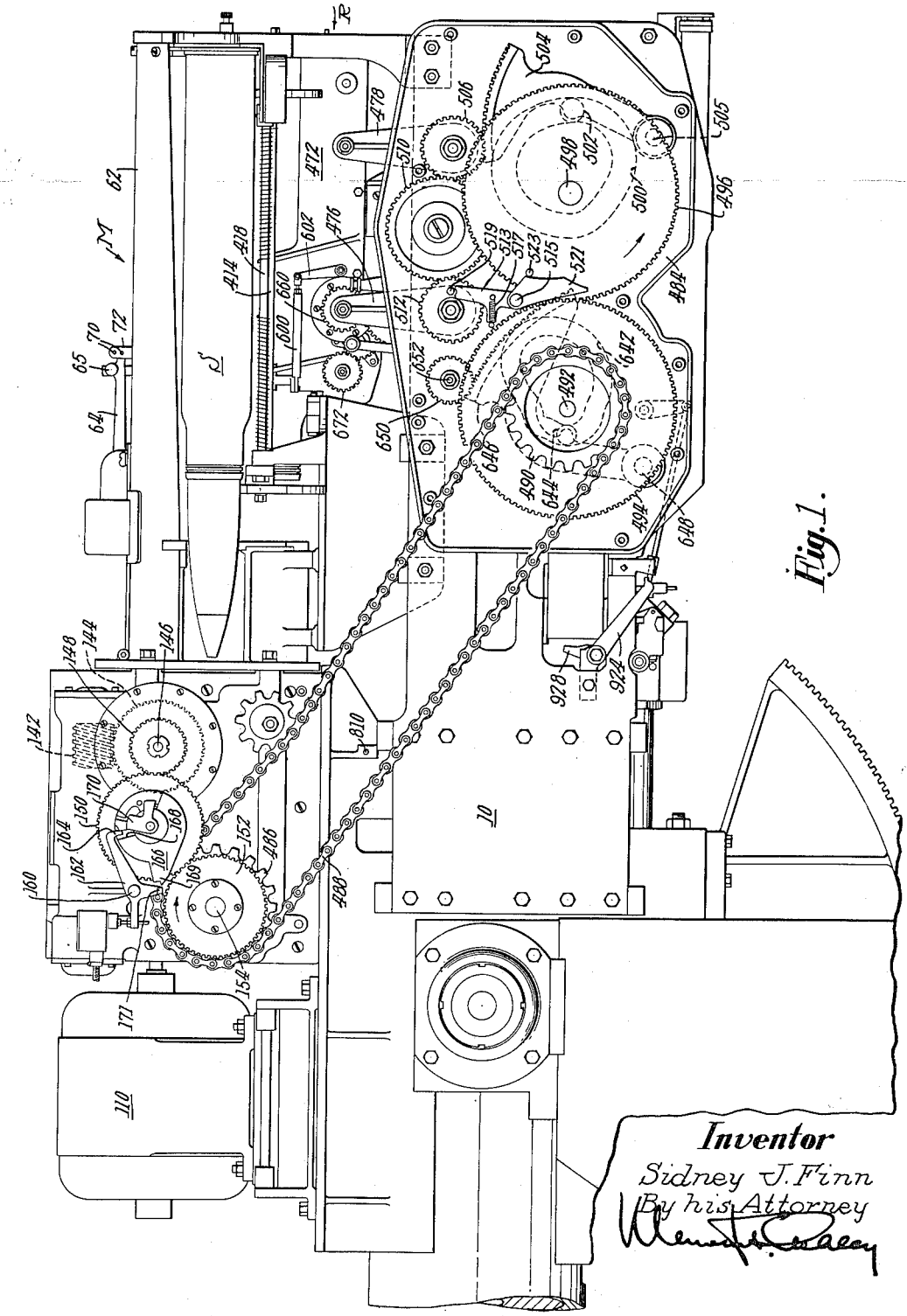
Fig. 1 is a view in left side elevation of a loading mechanism embodying the present invention, the mechanism being shown with the parts in the positions they assume when a shell is in the fuse-setting position.
Figure 2:
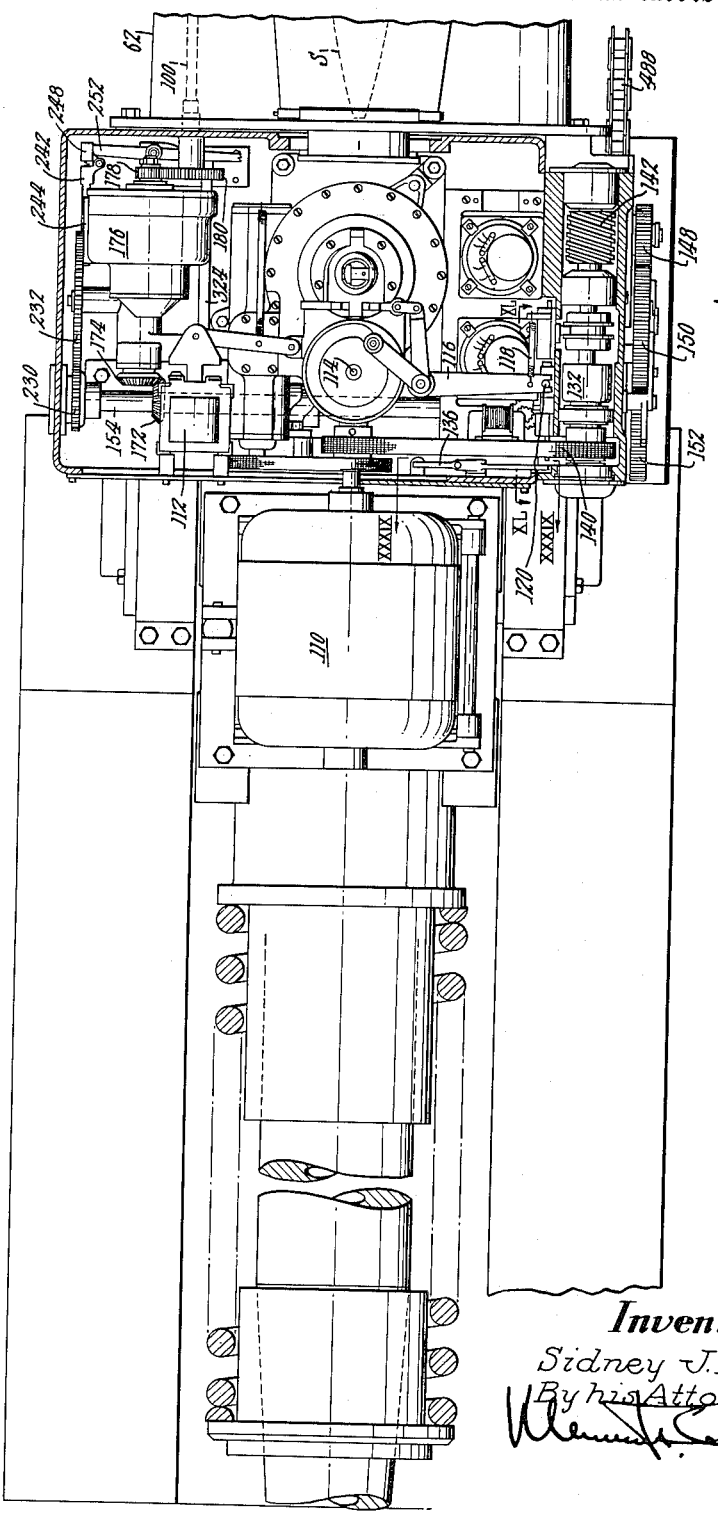
Fig. 2 is a plan view partly in section of the fuse-setting mechanism and the breech end of the gun.

The invention is illustrated herein as applied to a gun provided with a fuse-setting mechanism of the type illustrated and described in copending application, Serial No. 622,012, for Letters Patent of the United States, filed on October 12, 1945, in my name. Fig. 2 illustrates a plan view of such a fuse-setting mechanism F which is mounted on the carriage of the gun above the breech end and somewhat forwardly thereof. The shells are supported rearwardly of the fuse-setting mechanism as illustrated in Fig. 1 in a magazine M carried by side plates 10 secured to the gun carriage and extending rearwardly of the breech end of the gun. After the fuse-setting operation the shell S is carried rearwardly and downwardly and then forwardly and catapulted into the gun by a transfer and rammer mechanism R during which time another shell is fed in the magazine into fuse-setting position in alinement with a fuse cutter head 12 (Fig. 8) of the type described in the aforementioned application.

As illustrated in Figs. 14 and 18, the magazine M is arranged to hold three shells S, one of which is in alinement with the fuse cutter head in the fuse setter and one shell at each side thereof. At the conclusion of a fuse-setting operation, the center shell is removed from the magazine and one of the other shells is fed into fuse-setting position, the arrangement being such that the shells are alternately fed from one side and then the other in the normal operation of the apparatus, there being a man stationed at each side of the gun to load additional shells into the magazine during the firing of the gun. In the event that there is a man stationed at only one side of the gun the feeding mechanism can be operated to feed the shells successively from one side of the magazine, the feeding mechanism at the other side of the magazine being rendered idle during this time by means to be described.

The magazine includes a pair of spaced bottom walls 14 (Figs. 8 and 14) which are secured to the side plates 10 and include outer horizontal shell-supporting portions 16 and curved downwardly and inwardly extending shell-supporting portions 18 which are spaced apart at their inner ends to permit movement of a shell downwardly between the walls after the fuse has been set.

The magazine also includes a rear wall 20 (Figs. 3 and 18) provided with an opening in its central portion, as shown in Fig. 18, to accommodate movement of the transfer-rammer mechanism in moving the shell out of fuse-setting position and carrying it into alinement with the bore of the gun. As shown in Fig. 20, the wall 20 is provided with a groove 22 to receive the flange of the shell case thereby to prevent endwise movement of the shell in the magazine during its movement into fuse-setting position. For feeding the shells into fuse-setting position, feed sprockets 24, 26, 28 (Figs. 3 and 18) are provided at each end of the magazine, these sprockets being mounted on shafts 30, 32, 34, respectively, which are journaled at their rearward ends in the wall 20 and at their forward ends in a wall 36 (Fig. 3) which is carried by but spaced rearwardly from a plate 38 secured to the rearward wall of the fuse setter housing. During each indexing operation the shaft 32, carrying the sprockets 26, and either the shaft 30 or the shaft 34 are turned in unison in the same direction thereby to move one or the other of the shells in the magazine into fuse-setting position. The shell in the fuse-setting position is held against downward movement by a pair of gates 40, 42 (Fig. 10) which are located approximately at the center of gravity of the shell and hold it against the feed sprockets 26. In addition, the transfer-rammer mechanism, upon its return to shell-receiving position, after having loaded a shell into the gun, supports the weight of the shell in the fuse-setting position. The gates 40 and 42 are arranged to be retracted at the conclusion of the fuse-setting operation, as will be hereinafter described, to permit downward movement of the shell by the transfer-rammer mechanism.

Figure 9:
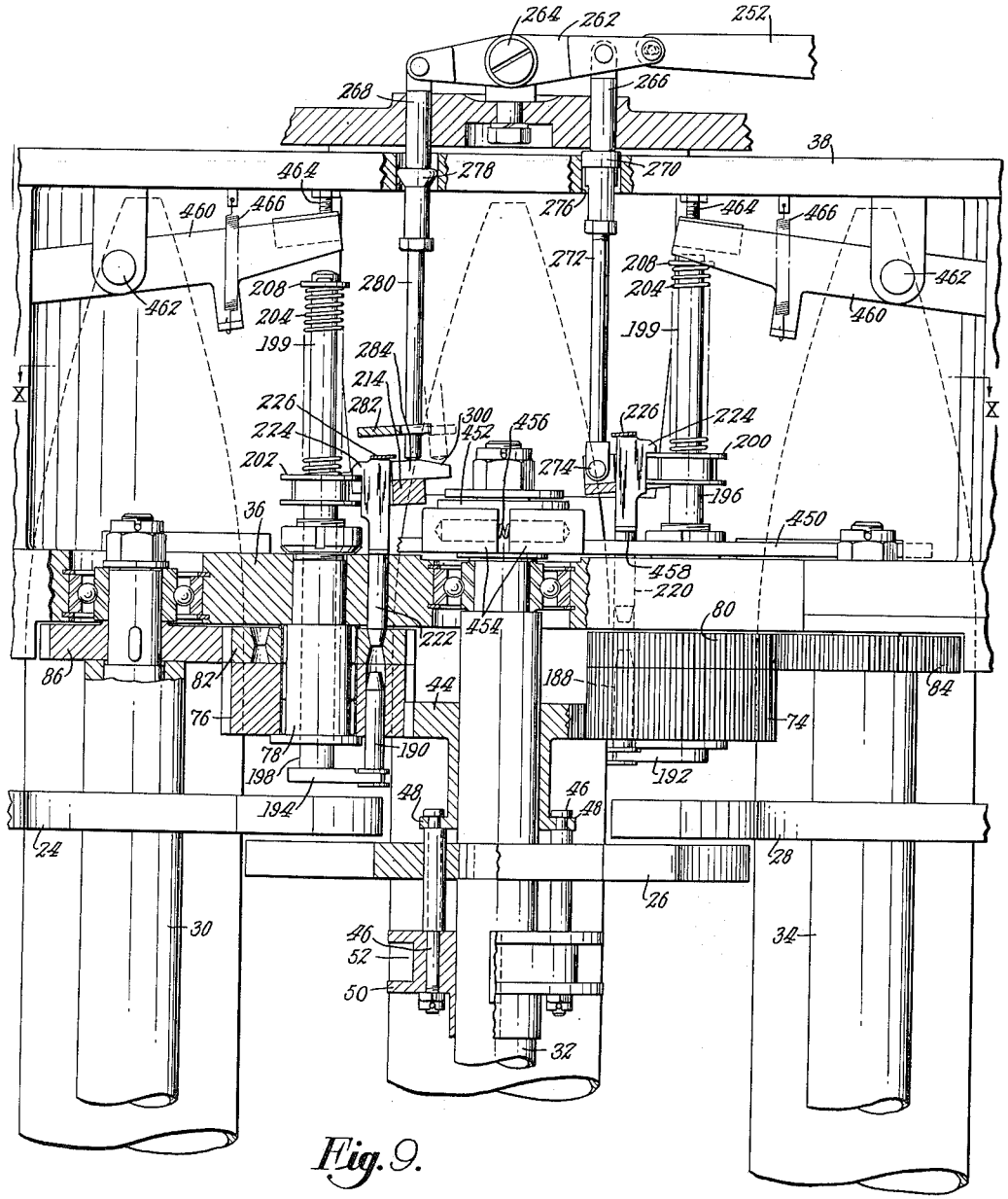
Fig. 9 is a section on the line IX—IX of Fig. 8.

The shaft 32, carrying the feed sprockets 26, is provided with a drive pinion 44 (Fig. 9) arranged for limited movement axially of the shaft, the arrangement being such that when the pinion is in the position shown in Fig. 9 shells are alternately fed from the two sides of the magazine but if the pinion is moved forwardly along the shaft, a distance approximately equal to the thickness of the pinion, the shells are fed from one side only of the magazine, as will be described. For moving the pinion 44 along the shaft 32 it is connected by pins 46 passing through a flange 48 on the pinion and through the sprockets 26 to a sleeve 50 provided with a peripheral groove 52. Received within the groove 52 is a pair of dogs 54 (Fig. 14) carried by the lower ends of arms 56 of a frame 58 pivoted between brackets 60 extending upwardly from a cover plate 62 of the magazine. Extending rearwardly from the frame 58 (Fig. 15) above the cover plate 62 is an arm 64 having a handle 65, the arm being provided at its rearward end with a boss 66 housing a spring-pressed detent 68 arranged to engage one of a pair of vertically spaced holes 70 in a projection 72 carried by the cover 62. With the arm 64 in its uppermost position the sleeve 50 and the pinion 44 are in the positions shown in Fig. 9. If, however, the detent 68 (Fig. 15) is withdrawn from the uppermost hole 70 and the arm lowered, the sleeve 50 is moved forwardly along the shaft 32 moving the pinion 44 into its other position in which, as will be explained, shells are fed from one side of the magazine only.

The pinion 44 meshes continually with a pair of pinions 74, 76 journaled on bearing sleeves 78 (Fig. 9) carried by the forward wall 36 of the magazine. Also journaled on the sleeves 78 forwardly of the pinions 76 are gears 80, 82 which mesh, respectively, with gears 84, 86 on the sprocket shafts 34, 30, respectively. When the magazine is to be loaded alternately from opposite sides, the pinion 44 is turned alternately in opposite directions by a segment 90 (Fig. 8) mounted on a shaft 92 which also carries a gear 94 arranged to engage the pinion 44 when the pinion is moved toward the right, as viewed in Fig. 9, in which case the pinion is moved in one direction only by the gear 94. The segment 90 is connected by a link 96 to a crank 98 on the outer end of a shaft 100 (Fig. 3) journaled in the walls 36 and 38. The shaft 100 also carries a sprocket wheel 102 connected by a chain 104 (Fig. 8) to a sprocket wheel 106 fast with the gear 94, the chain 104 passing over an idler sprocket 108. Thus it will be seen that upon turning the shaft 100 the segment 90 is rocked to and fro to impart movement first in one direction and then the other to the pinion 44 if the pinion is in engagement with the teeth of the segment 90, and to impart intermittent movement in the same direction to the pinion 44 if the pinion is in engagement with the gear 94.

For operating the shaft 100 (Fig. 3), a motor 110 (Figs. 1 and 2) is provided, this motor also providing the power for operating the fuse-setting mechanism. At the beginning of the fuse-setting operation a solenoid 112 is energized to cause engagement of a clutch which starts the rotation of a shaft 114 of the fuse setter, as illustrated in the aforementioned application. This shaft makes two revolutions during the first of which the fuse is set and during the second of which the fuse cutter head is withdrawn from the nose of the shell, the shell loaded into the gun, and the shaft 100 is turned to feed the shells in the magazine. Carried by the shaft 114 is a cam, not shown here but illustrated in the aforementioned application, in engagement with which is a follower on one end of a lever 116 held in engagement with the cam by a spring 118. The outer end of the lever is connected by a pin-and-slot connection 120 (Fig. 2) to a sleeve 122 (Fig. 40) slidable on a pin 124 which carries a clutch actuating member 126 received in a peripheral groove 128 of a clutch 132 (Fig. 2). The pin 124 carries a collar 129 forming an abutment for one end of a spring 130, the other end of which bears against shoulders formed in an end of the sleeve 122 thereby to form a yielding connection between the sleeve and the pin 124. The purpose of this is to permit movement of the sleeve by the arm 116 without causing engagement of the clutch 132 in the event that conditions are such as to make it inadvisable to operate the clutch.

An example of one such condition is in the event that the gun is not in its battery position. Referring to Fig. 39, a rod 134 is operated by the gun and moves downwardly when the gun fires, as will be explained, thereby to permit clockwise movement of a stop arm 136 under the influence of a spring-pressed plunger 138 so that the left end of the arm moves into alinement with the pin 124 until the gun returns to battery whereupon the parts assume the positions shown in Figs. 39 and 40. In the event, however, that the gun fails to return to battery, the left end of the arm 136 remains in alignment with the pin 124 thereby preventing movement of the pin by engagement of the sleeve 122 so that the clutch remains out of engagement.

The driving portion of the clutch member 132 is connected by a chain 140 to the shaft of the motor 110 which rotates continually. Upon engagement of the clutch 132 a worm 142 is rotated and this worm engages a worm gear 144 (Fig. 1) carried by a shaft 146 on which is also mounted a pinion 148 which meshes with a pinion 150 driving a gear 152 carried by a cam shaft 154 journaled in the forward portion of the fuse setter housing.

Provision is made for holding the clutch 132 in engagement until the cam shaft 154 has made one complete revolution during which the shell, the fuse of which has been set, is loaded into the gun and another shell is fed into fuse-setting position. For this purpose the sleeve 122 carries a pin 156 (Fig. 40) which is received in a recess in the outer end of an arm 158 extending upwardly from a shaft 160, which shaft also carries an arm 162 (Fig. 1) the outer end of which is provided with a projection 164 received in a recess of a member 166 carried by the shaft on which the pinion 150 is mounted. The recess in the member 166 is formed between a radially extending wall 168 and a member 170 pivoted on the shaft and movable relatively to the member 166. When the clutch is engaged, the arm 162 is moved upwardly, whereupon the member 170 is rocked in a counterclockwise direction by a spring-pressed plunger, as illustrated more clearly in the aforementioned application, into a position in which the arm 162 is held in the position into which it is moved during engagement of the clutch. As described in that application, the arm stays in this position, holding the clutch engaged, until the completion of one revolution of the cam shaft, whereupon a projection 169 of the member 166 engages an extension 171 of the arm 162, camming the member 170 back to the position shown and positively stopping the parts in such positions.

Figure 3:
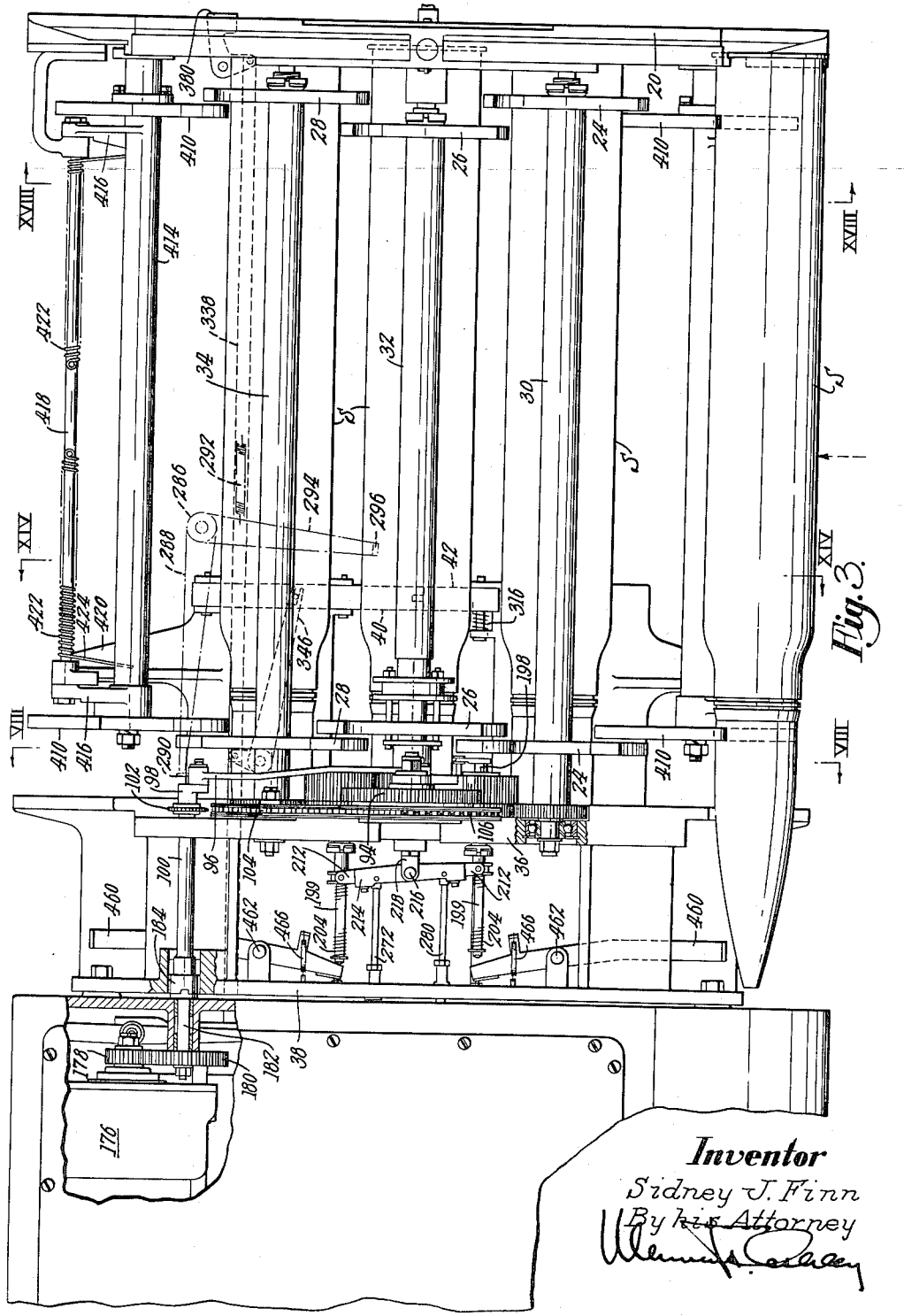
Fig. 3 is a plan view of the shell magazine located rearwardly of the fuse setter.
Figure 4:
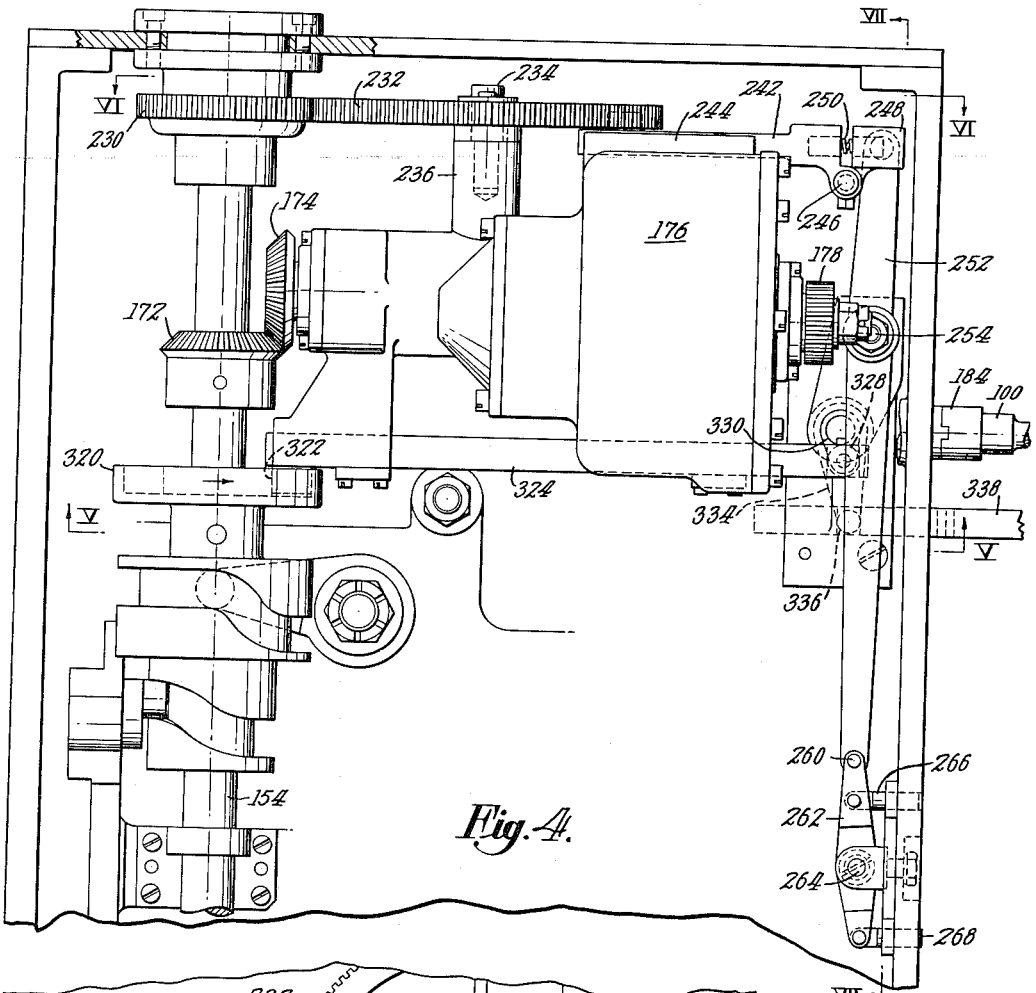
Fig. 4 is a plan view of the drive shaft for indexing the shells in the magazine and for operating loading mechanism which transfers the shells from the magazine into the gun.

As illustrated in Fig. 4, the cam shaft 154 carries a bevel gear 172 which engages a bevel engages a bevel gear 174 carried by a shaft on the input side of a variable speed mechanism 176, which is similar in principle to that illustrated and described in Letters Patent of the United States No. 2,309,595, granted January 26, 1943, on an application filed in the name of L. E. James. A gear 178 is driven by the mechanism 176, as described in the James patent, so that it starts rotating very slowly, accelerates to a maximum speed and then decelerates, coming to a gradual stop at the end of one revolution. The gear 178 meshes with a gear 180 (Fig. 3) carried by a shaft 182 connected by a coupling 184 to the shaft 100 by which motion is imparted to the segment 90 and the gear 94, as heretofore explained.

In the normal operation of the apparatus in which the indexing mechanism is driven by the segment 90, the pinions 74, 76 (Fig. 9) are alternately connected to the gears 80 and 82, thereby imparting motion alternately to the shafts 34 and 30 carrying the sprockets 28 and 24, respectively. For this purpose the pinions 74 and 76 are provided with apertures in which are slidable pins 188, 190 the forward ends of which are tapered to enter correspondingly shaped openings in the gears 80, 82 when the pins are moved forwardly or toward the right, as viewed in Fig. 9. As illustrated therein, the pin 188 is in engagement with the opening in the gear 80 so that the gear 80 will be driven from the gear 44, thereby to drive the sprockets 28, whereas the pin 190 is out of engagement with the gear 82 and this gear, accordingly, remains at rest. The pins 188, 190 are carried by arms 192, 194 secured to the rearward ends of rods 196, 198 which pass through the bearing sleeves 78 coaxially with the pinions 74, 76. Forwardly of the wall 36 the rods 196, 198 have reduced portions 199 on which are slidably mounted flanged collars 200, 202 held by springs 204 against shoulders formed by the reduced portions of the rods. The forward end of each spring abuts a collar 208 at the end of the rod. The purpose of mounting the collars 200, 202 for movement relatively to the rods 196, 198 will appear as the description proceeds.

Engaging the grooves in the collars 200, 202 are blocks 210 (Fig. 10) carried by outwardly extending arms 212 of a frame 214 pivoted for movement about a vertical axis by a shaft 216 (Fig. 3) passing through a bearing bracket 218 carried by the wall 36. It will be apparent that as the frame 214 is rocked about the axis of the shaft 216 the rods 196, 198 will be moved in opposite directions thereby to move one of the pins 188, 190 into engagement with the adjacent gear and move the other pin out of engagement with its adjacent gear.

The frame 214 is also utilized to operate a second pair of pins 220, 222 in unison with the pins 188, 190, respectively. The pins 220, 222 pass through the wall 36 and are provided with tapered ends engageable with correspondingly shaped openings in the gears 80, 82, the arrangement being such that when one of the pins engages the opening in the corresponding gear that gear is locked against movement so that the sprocket shaft driven thereby is locked in the rest position. The forward ends of the pins 220, 222 are provided with shouldered portions 224 which are held in engagement with the forward surfaces of the collars 200, 202 by leaf springs 226 (Fig. 10) carried by the upper portion of the frame 214. These springs provide yielding connections between the frame and the pins 220 and 222, for a purpose to be described.

Figure 6:
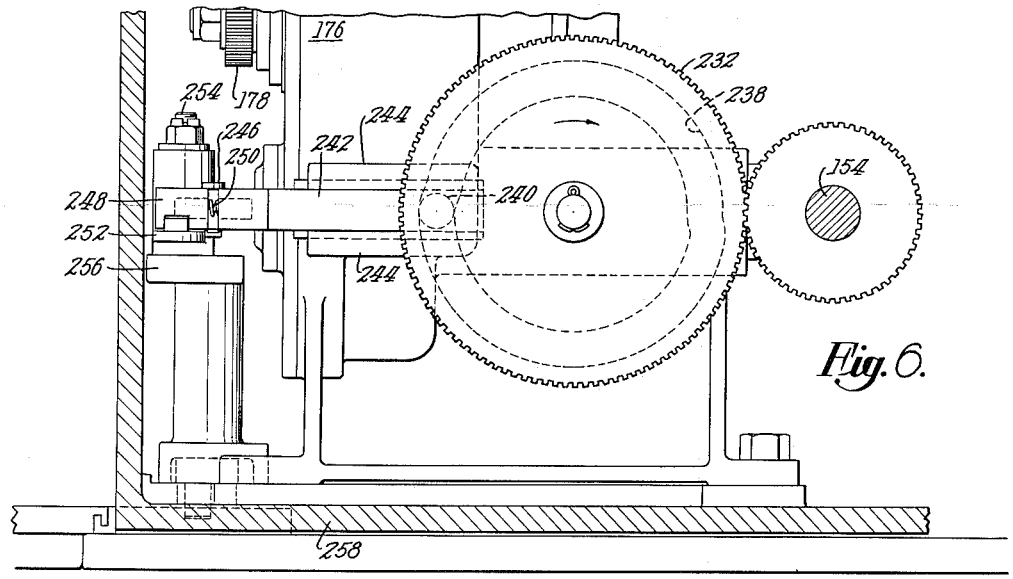
Fig. 6 is a section on the line VI—VI of Fig. 4.
Figure 7:
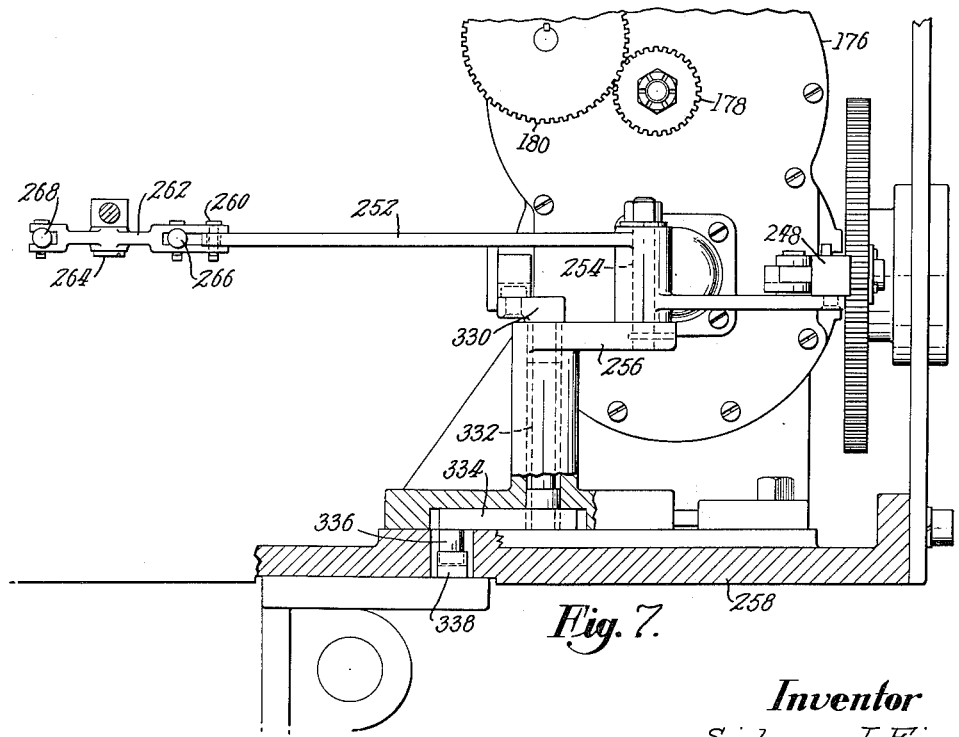
Fig. 7 is a section on the line VII—VII of Fig. 4.

For rocking the frame 214 to operate the pins 188, 190, 220 and 222, the following mechanism is provided. Carried by the cam shaft 154 (Fig. 4) is a pinion 230 which meshes with a gear 232 journaled on a pin 234 carried by a boss 236 on the housing of the variable speed mechanism 176. The gear 232, as shown in Fig. 6, is provided with a cam track 238 which receives a follower 240 carried by a slide 242 supported in ways 244 on the housing of mechanism 176. The outer end of the slide 242 has pivoted to it at 246 a block 248 urged away from the adjacent end of the slide 242 by a compression spring 250 providing a yielding connection between the block and the slide thereby to avoid damage in the event that the pins 188, 190, 220 and 222 actuated thereby are not properly alined with the apertures in the adjacent gears. Pivoted at one end to the block 248 is a lever 252 fulcrumed on a pin 254 carried by a bracket 256, as shown in Fig. 7, mounted on a support 258 on which the variable speed mechanism 176 is carried. The outer end of the lever 252 is pivoted at 260 to a lever 262 (Figs. 4 and 9) which is in turn pivoted at 264 on the rear inside wall of the fuse setter housing. Pivoted to the lever 262 at opposite sides of the fulcrum 264 are plungers 266, 268 which pass through holes in the adjacent wall of the fuse setter housing. The plunger 266 engages a cylindrical guide member 270 (Fig. 9) carried by the forward end of a connecting rod 272 which at its rearward end is pivoted at 274 to the frame 214, the member 270 being supported in an aperture 276 in the plate 38. The plunger 268 engages a guide member 278 carried by the forward end of a rod 280, the rearward end of which passes through an aperture in the lower end of a lever 282 (Figs. 9 and 10) which, in the position shown in these figures, supports the rearward end of the rod 280 in engagement with a plate 284 carried by the frame 214 at the opposite side of its fulcrum from the pivot 274.

From the above it will be evident that upon rotation of the cam shaft 154 (Fig. 4), the lever 262, through the above-described connections including the cam track 238, will be rocked about the pivot 264 once for each rotation of the cam shaft, thereby to move the plungers 266, 268 in opposite directions. These movements of the plungers are transmitted through the rods 272 and 280 to the frame 214 so that the gears 80 and 82 are alternately connected to the gears 74, 76 by the pins 188, 190, respectively, the pins 220, 222 being simultaneously actuated to lock that one of the gears 80, 82 which is not connected to the adjacent gears 74 and 78.

As described above, when it is desired to feed shells from one side of the magazine only, the frame 58 (Fig. 14) is shifted to move the pinion 44 (Fig. 9) forwardly along the shaft 32 thereby to move it into engagement with the driving gear 94 (Fig. 8) so that upon each rotation of the shaft 100 (Fig. 3) the pinion 44 will be turned in the same direction. At this time the feeding is all done from the left-hand side of the magazine or by the sprockets 24. Accordingly, the frame 58 should not be shifted unless the pins 188, 190, 220, 222 are in positions opposite to those shown in Fig. 9 with the gears 76 and 82 locked together, the gears 74 and 80 disconnected, and the gear 80 locked against rotation. Referring to Fig. 15, the detent 68 must be withdrawn from the aperture in the projection 72 before the handle of the frame 58 can be depressed to move the pinion 44 forwardly along the shaft 32. Pivoted on the under side of the cover 62 is a bell-crank lever 286 (Figs. 3 and 14) having an arm 288 provided with a projection 290 held in engagement with the crank 98 by a spring 292 connected between the other arm 294 of the lever and the cover plate. The outer end of the arm 294 has an upwardly projecting portion 296 which extends through an opening 298 (Fig. 15) in the cover plate 62 and is arranged to oscillate between the full line position and the broken line position as illustrated. With the portion 296 of the arm 294 in the broken line position, it is located directly in front of the handle of the detent 68 thereby preventing withdrawal of the detent from the hole 70 at which time the pins 188, 190, 220, 222 are in the positions shown in Fig. 9. The projection 296 of the arm 294 (Fig. 15) will assume the full line position during the next indexing movement in which the pins 188, 190, 220, 222 have been shifted by rocking movement imparted to the frame 214 into their other positions. It will be understood that at this time the lever 262 has been moved in a clockwise direction, as viewed in Fig. 9, with the plunger 268 retracted and the plunger 266 advanced, thereby causing the pin 220 to move into engagement with the gear 80.

It is necessary when shells are to be indexed from the left side only that during the alternate movements of the lever 262 no motion be imparted to the frame 214 which would change the positions of the pins 188, 190, 220 and 222. Accordingly, the rod 280 is moved into the broken line position so that when the lever 262 is moved in a counterclockwise direction the rearward end of the rod will be located opposite a slabbed-off portion 300 of the plate 284 and will not impart any movement to the frame when the rod 280 is again moved rearwardly by movement of the lever 262. For this purpose the lever 282 which supports the rearward end of the rod 280 is rocked in a clockwise direction, as viewed in Fig. 10, by the movement of the frame 58 (Fig. 15) to move the pinion 44 forwardly along the shaft 32. For this purpose a bell-crank lever 302 (Fig. 14) is pivoted to the under side of the cover plate 62 and has a ball-and-socket connection 304 with the frame 58 whereby upon movement of the frame to shift the pinion 44 along its shaft the lever is rocked about its fulcrum pin 306 (Figs. 14 and 15). The other arm of the bell-crank lever has a ball-and-socket connection 308 (Fig. 10) with the upper end of the lever 282. This lever is thus rocked in a clockwise direction when the frame 58 (Fig. 14) is shifted to cause the magazine to index from one side only. This movement of the lever 282 shifts the rod 280 into the dotted line position (Fig. 9), which movement is provided for by the supporting member 278 which permits the rod 280 to pivot relatively to the plate 38.

Figure 10:
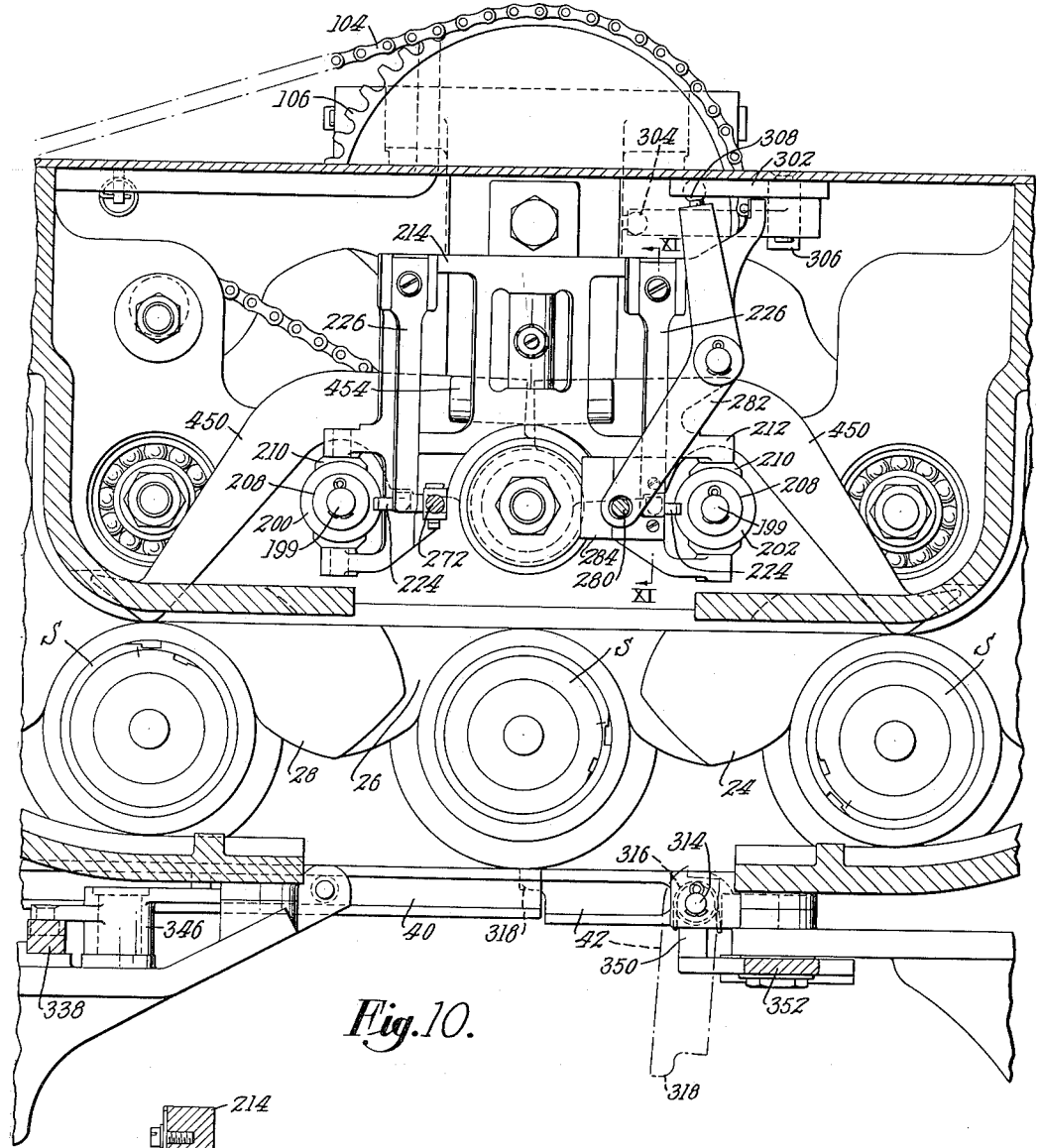
Fig. 10 is a section on the line X—X of Fig. 9.
Figure 11:
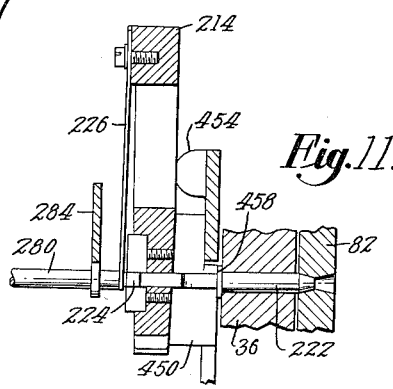
Fig. 11 is a section on the line XI—XI of Fig. 10.

As stated above, the shell is held in fuse-setting position against the sprockets 26 by a pair of gates 40, 42 (Figs. 10 and 14) which engage the under side of the shell near its center of gravity. At the conclusion of each fuse-setting operation and at the beginning of the feeding movement, these gates are opened so that withdrawal of the shell from the magazine is permitted. The gate 40 is supported for sliding movement by rolls 310 (Fig. 16) carried by the bifurcated end of an arm 312 extending upwardly from the bottom wall 14 of the magazine. The other gate member 42 is pivoted on a pin 314 (Fig. 10) and is normally held in its operative or full line position by a spring 316. The gate 42 has a projection 318 which rests on a shoulder formed in the gate 40, as shown in Fig. 10, when the gates are in shell-supporting positions. Upon movement of the gate 40 toward the left, as viewed in Fig. 10, the gate 42 is free to be moved downwardly by the weight of the shell to permit movement of the shell from the magazine. As soon, however, as the shell has passed from the magazine the spring 316 acts to move the gate 42 back into the full line position in which it is locked after the gate 40 has returned into the position shown in Fig. 10.

Figure 5:
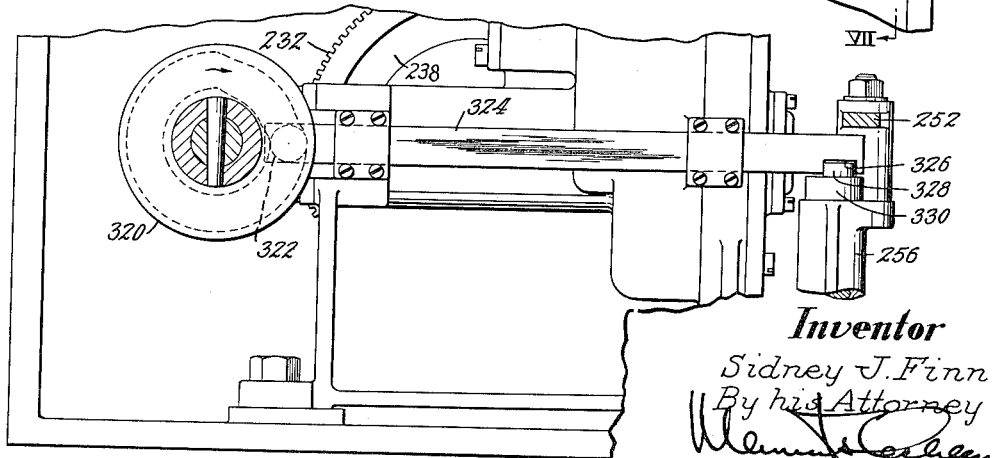
Fig. 5 is a section on the line V—V of Fig. 4.

For thus moving the gate 40, a cam 320 (Fig. 4) is mounted on the cam shaft 154. This cam has a groove in one face thereof which receives a cam roll 322 carried by one end of a slide 324 supported in ways formed in the side of the housing of the variable speed mechanism 176. The rearward end of the slide 324 is provided on its underside with a slot 326 (Fig. 5) in which is received a roll 328 carried by an arm 330 secured to a shaft 332 (Fig. 7) supported by the bracket 256. The lower end of the shaft 332 carries an arm 334 having a downwardly projecting pin 336 received in a recess in a slide 338.

Figure 12:
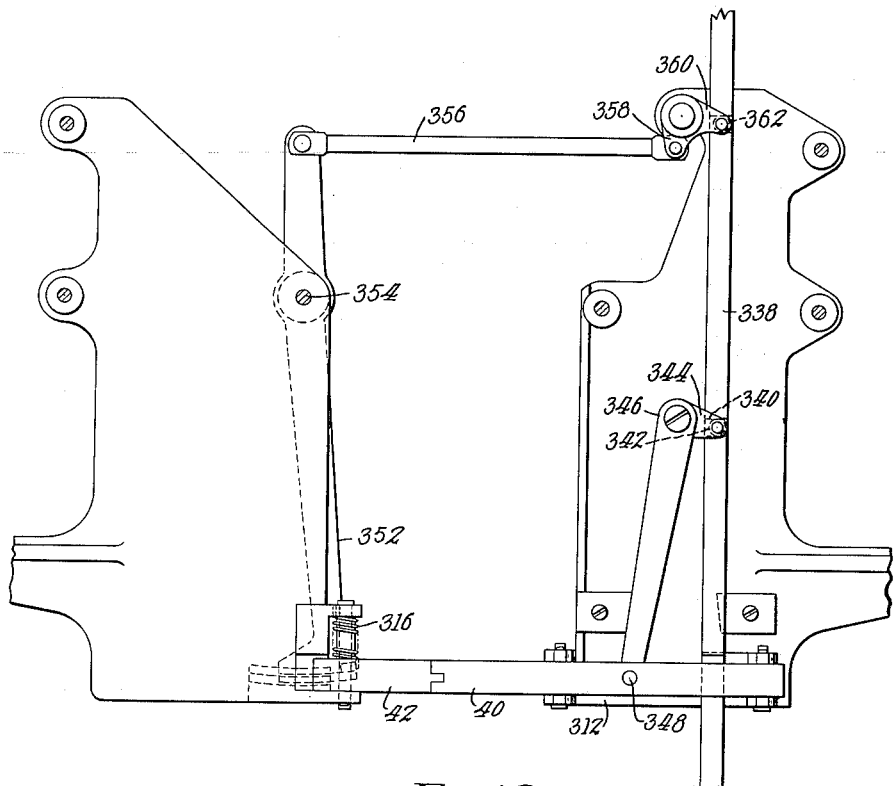
Fig. 12 is a plan view of the front gate for supporting a shell in the magazine during the fuse-setting operation.

The slide 338 (Fig. 12) is provided intermediate its ends with a slot 340 in which is received a roll 342 carried by the end of an arm 344 of a bell-crank lever 346, the other arm of which is connected at 348 to the gate 40 so that upon movement of the slide 338 forwardly or to the left, as viewed in Fig. 4, the gate member 40 is moved toward the right (Fig. 12) out of supporting engagement with the shell.

Figure 13:
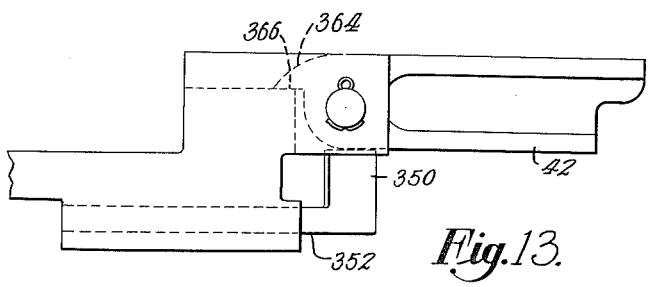
Fig. 13 is a rear elevation of the left end of the gate.

Provision is made for insuring that the gate 42 is moved back into horizontal position, as shown in Fig. 13, after the shell has been moved out of fuse-setting position so that the gate 42 will be in the proper position when the gate 40 is returned. This movement of the gate 42 is normally effected by the spring 316 but in the event that the spring fails properly to return the gate an upstanding arm 350 (Fig. 13) carried by the rearward end of a lever 352 is provided. This lever is pivoted to the framework at 354 and is connected by a link 356 to a bell-crank lever 358 having an arm 360 carrying a roll 362 received in a slot in the slide 338. When the gate 40 is retracted by movement of the slide 338, the lever 352 is rocked in a clockwise direction, as viewed in Fig. 12, to carry the end 350 out from under the gate 42, whereby the gate is free to drop under the weight of the shell, the gate 40 also being out of supporting engagement with the gate 42 at this time. Before the gate 40 returns to its shell-supporting position, the lever 352 starts to move in a counterclockwise direction with the result that the upstanding end 350 thereof will strike the gate 42 if it should be stuck in its down position. As shown in Fig. 13, the gate 42 has an ear 364 engageable with an abutment 366 to prevent upward movement of the gate 42 beyond a horizontal position.

Referring to Fig. 20, mechanism engageable with the flange of the shell at the top thereof while the shell is in fuse-setting position and its flange is out of engagement with the groove 22 in the wall 20 is provided to hold the shell against lengthwise movement during the fuse-setting operation. For this purpose a vertically slidable block 368 is provided having in its lower face a groove to receive the flange of the shell. This block is normally urged downwardly by a spring 370 into a position determined by the engagement of a pin 372 with the lower end of a slot 374 in a wall of the housing in which the block is mounted for vertical movement. It is necessary that the block 368 be lifted at the conclusion of the fuse-setting operation to permit removal of the shell from the magazine inasmuch as the shell is moved rearwardly as well as downwardly upon leaving the magazine. The rearward end of the slide 338 (Fig. 21) is provided with a slot 376 which receives a pin 378 projecting downwardly from one arm of a bell-crank lever 380 pivoted at 382 on a boss 384 extending inwardly from the wall 20. One arm of the bell-crank lever has a recess 386 to receive the lower end of a lever 388 (Fig. 19) pivoted at 390 within a recess 392 formed in the outside of the rear wall 20 of the magazine. The lever 388 includes a horizontal arm 394 terminating in a cup-shaped portion 396 (Fig. 20) in which is slidable a spring-pressed detent 398 engageable with a recess in the back of the block 368. From the above it will be seen that upon movement of the slide 338 to open the gates, the bell-crank lever 380 (Fig. 21) is moved in a clockwise direction, causing the arm 394 of the lever 388 to move upwardly thereby lifting the block 368 out of engagement with the flange at the rear end of the shell. By withdrawing the spring-pressed detent 398 from engagement with the block 368, the block may be manually lifted at any time to permit withdrawal of a shell from the fuse-setting position if desired.

Provision is made for permitting free rotation of the sprockets 24 or 28 in order manually to load a shell in the magazine in position adjacent to the fuse setter, as will be described. In such case it is desirable to provide means for positively limiting the movement of the shells toward the fuse-setting position and for this purpose arms 400 (Figs. 18 and 20) are provided. These arms are pivoted at 402 to arms 404 journaled on the shaft 32, there being springs 406 which urge the arms 400 downwardly relatively to the arms 404 into positions determined by engagement of the upper ends of the arms 400 with shoulders on the arms 404. Links 408 connect the pins 402 to the pin 372 which is movable vertically with the block 368. When the block is lifted the links 408 are moved upwardly causing the arms 404 to pivot upwardly, raising the arms 400 above the shells with which they are in engagement, thereby to permit movement of the shells into fuse-setting position. The springs 406 provide for upward movement of the arms 400 relatively to the arms 404 in the event that the arms 400 are not lifted sufficiently to clear the upper surfaces of the shells.

To assist in feeding shells into engagement with the sprockets 24 and 28 and to hold the shells in engagement therewith after they have been thus fed so that the shells will be moved by the sprockets into the position previously occupied by a shell which has just been moved into fuse-setting position, a pair of feed disks 410 is located at each side of the magazine, as shown in Figs. 3, 14 and 18. Each of these disks is provided with a pair of oppositely disposed recesses 412 arranged to embrace a shell upon movement of the disks from the positions shown in Fig. 14 by forcing a shell thereagainst, as indicated by the arrows. Each pair of the disks 410 is carried by a shaft 414 which is in turn supported by arms 416 journaled on a shaft 418. The shafts 418 are each carried by frame members 420 and to these shafts are secured torsion springs 422 having ends 424 which underlie the shaft 414 and urge it upwardly into a position determined by the engagement of an abutment 426 with an arm 428 (Fig. 17) carried by the shaft 418. One disk 410 of each pair is provided with a pair of openings 430 disposed at opposite sides of the axis and arranged to be selectively engaged by a detent 432 carried by the arm 416 and urged into engagement with the disk 410 by a spring 434.

Assuming a shell is to be loaded from the right side of the apparatus, as viewed in Fig. 14, the operator places the shell on the horizontal supports 16 and forces the shell in the direction of the arrow against the disks 410, causing the disks to turn, by engagement with the shoulders at the edges of the recesses, in a counterclockwise direction until the shell has been moved into engagement with the faces 436 of the sprockets 28. At this time the disks 410 present unbroken curved edges to another shell which is placed on the supports 16 so that another shell cannot be loaded until the previously loaded one has been fed downwardly by the sprockets 28. The springs 422 which support the shafts carrying the disks 410 in their upper positions are not strong enough to support the weight of the shells and, accordingly, pivoted supports 440 (Fig. 8) are provided forming continuations of the horizontal surfaces 16. These supports are pivoted at 442 and are urged upwardly by springs 444 into the positions shown with the outer ends of the supports in engagement with pins 446. With the shell held against the surface 436 of the sprockets 28, it rests on the supports 440 until the sprockets 28 are indexed to feed a shell into fuse-setting position. At this time it forces the newly presented shell downwardly, causing the supports 440 to move against the force of the springs 444 permitting downward movement of the shell and the shaft carrying the disk 410 also moves downwardly against the forces of the torsion springs 422. After the shell has been removed by the sprockets 28 from engagement with the recesses in the disks 410, the springs 422 move these disks up into their original positions and the disks at this time have been turned 180° from their original positions and are thus held by the detents 432 (Fig. 17). Thus it will be seen that the disks 410 serve to assist the manual loading of the magazine with each end of the shell in engagement with the respective sprocket and with the shell thus held in engagement with the sprockets so that it will be carried downwardly when the sprocket is indexed.

Should the operator fail to supply a shell to the side of the magazine during an indexing operation, there will be no shell below the sprockets 24 or 28 on that side of the magazine to be subsequently indexed into fuse-setting position. Consequently, during a subsequent indexing operation no shell will be fed to the fuse setter unless a shell is manually positioned below the sprockets. By withdrawing both locking pins from one of the gears 80 or 82, the particular sprockets driven thereby may be manually rotated, thereby permitting a shell to be moved into position therebelow.

To permit this manual operation two feelers 450 (Fig. 10), one for each side of the magazine, are provided for engagement with a shell. These feelers are journaled on a bushing 452 (Fig. 9) carried by the forward end of the shaft 32 and are provided with oppositely disposed bosses 454 having recesses in which is housed a compression spring 456 for moving the outer ends of the feelers 450 downwardly. Assume that a shell has been fed by the sprockets 28 (Fig. 9) into fuse-setting position but that the operator has failed to supply another shell to these sprockets. The associated feeler 450 will move downwardly into engagement with the rearward surface of a flange 458 carried by the pin 220 thereby holding that pin in the position shown in Fig. 9 even after the frame 214 has been rocked to move the pin 188 out of engagement with the gear 80. This movement of the frame without a corresponding movement of the pin 220 is permitted by the leaf spring connection 226 between the frame 214 and the pin. It will be understood that the feeler 450 at the other side of the magazine will operate in a similar manner after feeding of the shell by the sprockets 24 in the event that another shell has not been supplied to that side of the magazine. Assume now that there is no shell at either side of the magazine in position to be fed into fuse-setting operation. In that event the feelers 450 will be holding both the pins 220 and 222 out of locking engagement with the gears 80 and 82, respectively. However, depending upon the position of the frame 214, either the pin 188 or the pin 190 will engage the gear 80 or 82, respectively, and let it be assumed that the pin 188 at that time is in engagement with the gear 80. A shell can be readily fed under the sprockets 24 because the gear 82 is free to turn, permitting free rotation of the sprockets 28. However, the sprockets 28 cannot be freely turned because of the connection of the gear 80 with the gear 74 by the pin 188. Consequently, this pin must be moved rearwardly to permit movement of a shell below the sprockets 28. For this purpose an arm 460 is provided for moving the rod 196 rearwardly, this movement being permitted, while the pin 220 is locked in its outer position, by the spring 204. The arm 460 is pivoted at 462 to a bracket extending rearwardly from the plate 38, the inner end of the arm being held against a stop screw 464 by a tension spring 466. By moving the outer end of the arm 460 forwardly the inner end engages the forward end of the rod 196, moving it rearwardly so as to free the sprockets 28 temporarily while a shell is moved into position therebelow. Each side of the magazine is provided with a shifting arm 460, as described above.

Figure 25:
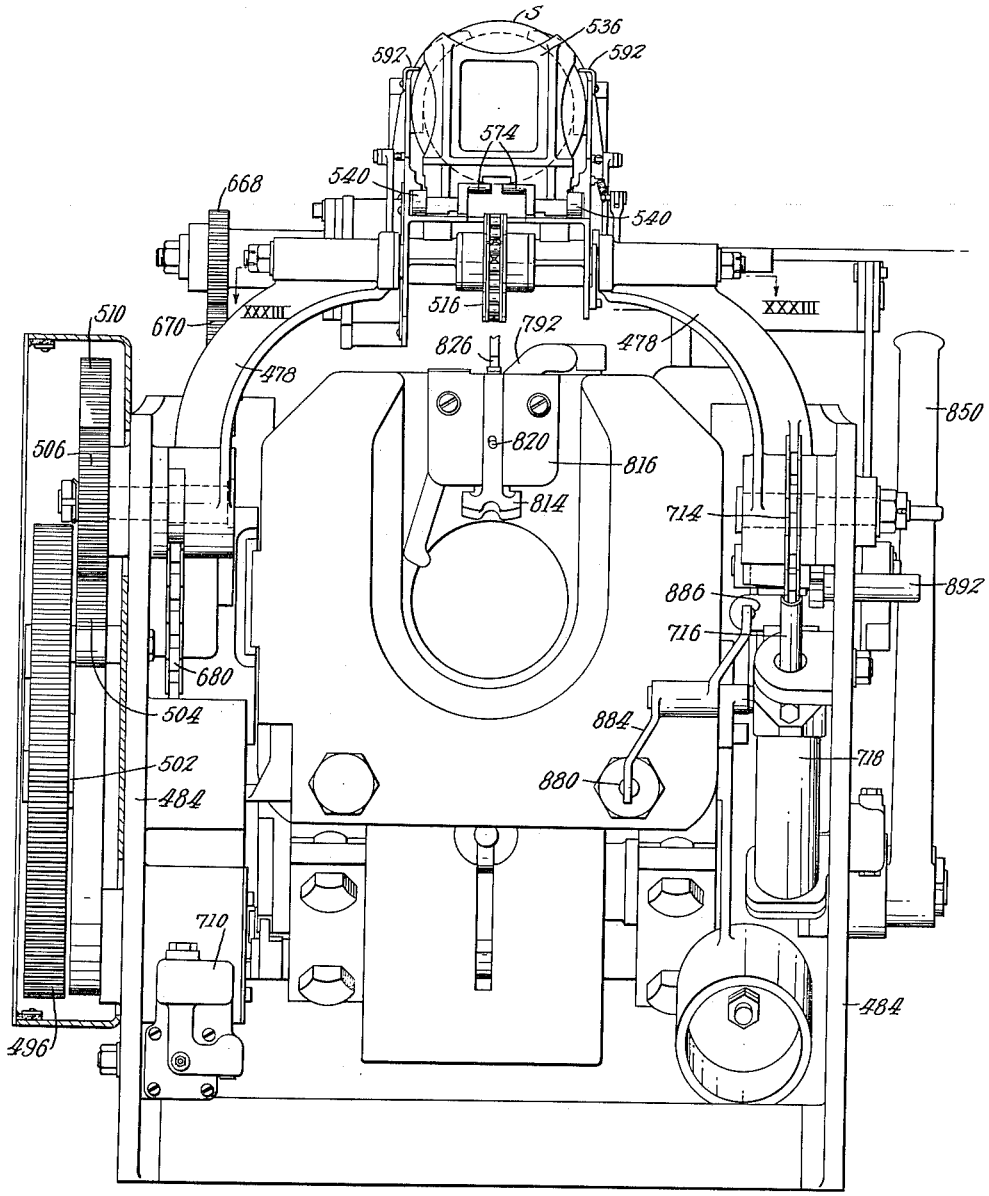
Fig. 25 is a rear elevation of the gun and the loading mechanism.

At the completion of the fuse-setting operation, the shell is carried from fuse-setting position, as shown in Fig. 22, downwardly and rearwardly and then forwardly into alinement with the breech of the gun by a transfer tray 470. This tray comprises a pair of side plates 472 (Fig. 26) connected by a horizontal partition 474 providing a member which is substantially H-shaped in cross-section. This tray is supported by two sets of arms 476, 478 (Fig. 22) which are secured at their upper ends to shafts 480, 482, respectively, journaled in the side plates 472. These arms curve outwardly and downwardly, as indicated in Fig. 25, when the tray is in its upper position, the lower ends of the arms being journaled in side plates 484 secured to the gun carriage and extending rearwardly thereof. These arms 476 and 478 are swung in a counterclockwise direction, as viewed in Fig. 22, into the broken line positions to move the tray into loading position by means which will now be described.

As shown in Fig. 1, the cam shaft 154 which starts rotating at the end of the fuse-setting operation, as heretofore described, carries a sprocket 486 connected by a sprocket chain 488 to a sprocket 490 carried by a shaft 492 journaled in a bearing in the plate 484. This shaft carries a gear 494 which meshes with a gear 496 on a shaft 498. A cam groove 500 is formed in the inner face of the gear 496 and receives a follower 502 carried by a gear segment 504 pivoted at 505 on the plate 484. The gear segment 504 meshes with a pinion 506 carried by a shaft 508 (Fig. 22) on which the arm 478 is supported. This shaft is connected by gears 510, 512 to a shaft 514 carrying the arm 476. It will be apparent from the shape of the cam groove, as illustrated in Fig. 1, that upon a half revolution of the shaft 498 or of the cam shaft 154 the segment 504 will move in a counterclockwise direction and then will return during the second half revolution of the shaft. Thus, the transfer tray is moved by the arms 476, 478 into alinement with the bore of the gun and then returns into position to receive another shell from the magazine during a complete revolution of the cam shaft.

Provision is made for preventing dropping of the tray from its shell-receiving position under the influence of gravity in the event of failure of any part of the drive mechanism. An arm 513 (Fig. 1) pivoted at 515 is held by a spring 517 in a position in which its upper end underlies a pin 519 carried by the gear 512. Should any of the drive mechanism fail with the tray in its upper position, gear 512 would be locked against rotation by engagement of the pin 519 with the upper end of the arm 513. The arm is moved out of the path of movement of the pin 519 upon rotation of the gear 496 to permit downward movement of the tray in the normal operation of the apparatus. For this purpose a cam 521 is connected to the arm 513 and is positioned for engagement by a pin 523 carried by the gear 496 so that the pin by its initial engagement with the cam upon rotation of the gear 496 moves the arm 513 in a clockwise direction against the action of the spring 517 out of the path of movement of the pin 519 and the tray is free to be moved downwardly.

For supporting the shell within the transfer tray and moving it relatively thereto a chain 516 is provided and is carried by sprockets 518, 520 (Figs. 27 and 32) carried by shafts 522, 524 journaled in the opposite ends of the tray. For adjusting the tautness of the chain, the shaft 522 is carried by eccentric bearings, as indicated in Fig. 22, carrying an arm 526 by which the bearings may be turned to adjust the position of the shaft, the outer end of the arm 526 carrying a pin 528 engageable with apertures in the plate 472. The chain 516 carries a plurality of supporting members 530 (Figs. 23 and 26) by which the shell is supported along its mid section. The back end of the shell is supported by a carriage 532 which is formed of a pair of curved shell supports 534 (Figs. 23 and 29) interconnected at their rearward ends by a vertical plate 536 engageable with the back end of the shell and having a pair of forwardly extending flanges 538 (Figs. 23 and 27) engageable with the periphery of the flange at the rearward end of the shell thereby to hold the rearward end of the shell downwardly against the supports 534. The supports 534 travel on rolls 540 (Fig. 29) received in grooves in the side plates 472 of the transfer tray.

Figure 32:
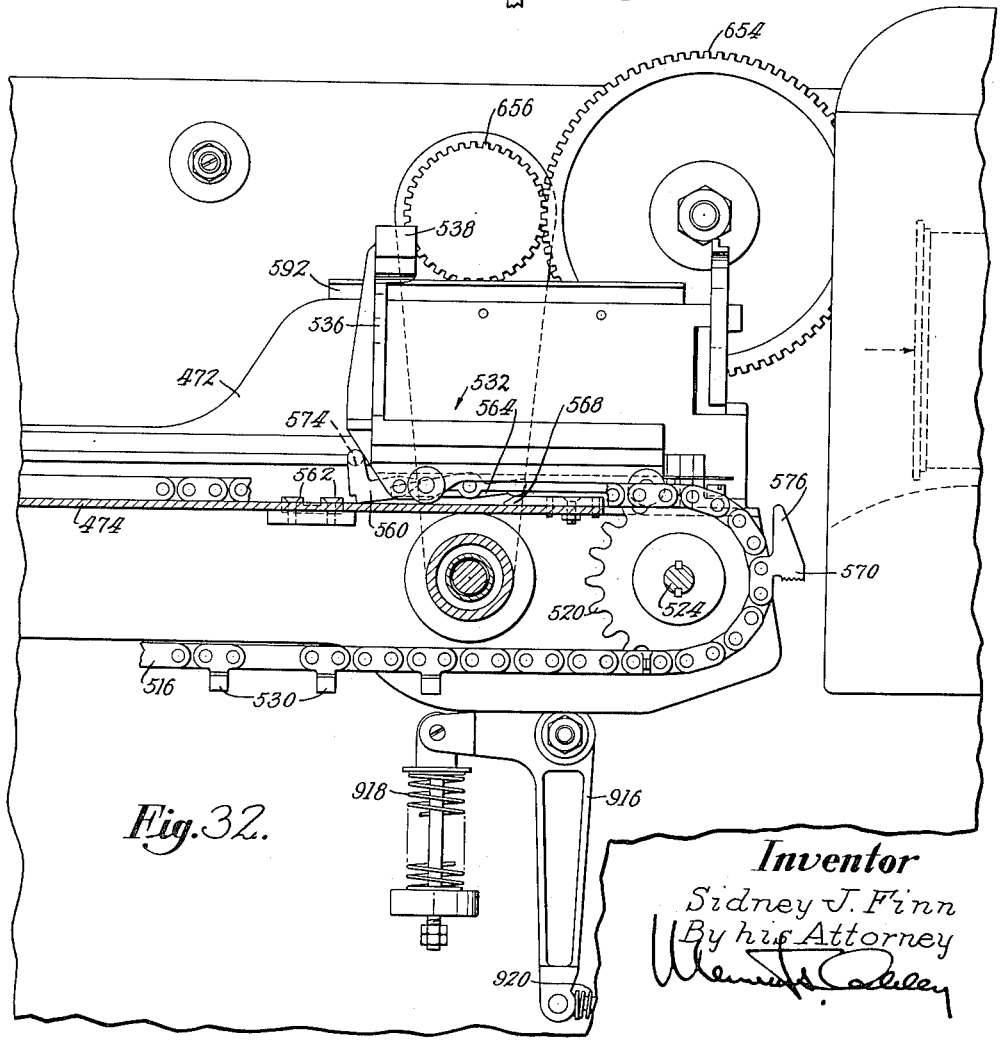
Fig. 32 is a section on the line XXXII—XXXII of Fig. 23.

The carriage is releasably connected to the chain 516 for movement therewith until the carriage reaches the forward end of the transfer tray whereupon this connection is broken and the chain continues to operate, in a manner to be described, relatively to the transfer tray and the carriage to complete the ramming movement of the shell. The chain 516 carries a pair of laterally extending lugs 542, one of which is shown in Fig. 23, each of these lugs being engageable with the rearward end of a latch 544 pivoted at 546 in a recess formed in the support 534. Each of the latches is normally held in position for engagement with the adjacent lug 542 by a spring 550 which, however, permits the latch to be withdrawn from engagement with the lug when the forward end of the latch is moved toward the chain 516. At the forward end of the tray is provided a pair of cams 552 which are so arranged that when the carriage reaches the forward end of the tray the forward ends of the latches 544 are moved toward each other thereby moving their rearward surfaces out of engagement with the lugs 542 whereupon the chain is free to move relatively to the carriage. Resilient bumpers 554 are provided on the rearward surfaces of the cams 552 for engagement by the forward ends of the supports 534 of the carriage. A leaf spring 556 is arranged to engage a recess 558 in the side of the carriage to hold the carriage in position at the end of the transfer tray. Pivoted to the rear end of the carriage, as shown in Fig. 32, are latches 560 which ride over a pair of projections 562 secured to the center partition 474 of the transfer tray and prevent accidental rearward movement of the carriage 532 should the spring 556 fail to hold it in its forward position.

During the forward movement of the chain and carriage as a unit, the shell is held against the vertical plate 536 to prevent forward movement thereof relatively to the carriage by a pair of pawls 564 (Figs. 23 and 28) pivoted to the supports 534 at their inner edges. Springs 566 (Fig. 28) hold the pawls in engagement with the flange at the end of the shell until such time as the carriage is to be disconnected from the chain 516. For thus releasing the pawls the center partition 474 carries a pair of cam members 568 (Figs. 23 and 32) over which the forward ends of the pawls 564 ride moving the rearward ends downwardly and permitting the shell to be moved forwardly of the carriage. For completing the movement of the shell into the gun with the transfer tray in its lowermost position the chain 516 carries a shell-engaging member 570 (Figs. 27 and 28) which acts on the rearward surface of the shell to propel it forwardly in response to the continued movement of the chain.

After the shell has been rammed into the gun, the transfer tray is returned to its initial position during which time the chain 516 is moved back into its original position. During this movement of the chain the carriage 532 is again coupled to it by engagement of the lugs 542 (Fig. 23) with abutments 572 on the carriage, whereupon the carriage moves rearwardly with the chain. It is necessary, however, that the latches 560 be raised so that they will pass over the abutments 562 to permit the return movement of the carriage. For this purpose the latches 560 have lateral extensions 574 (Fig. 25) which are engaged by an inclined tail surface 576 of the shell-engaging member 570, whereupon the latches 560 are lifted to free the carriage 532 for its rearward movement.

Figure 29:
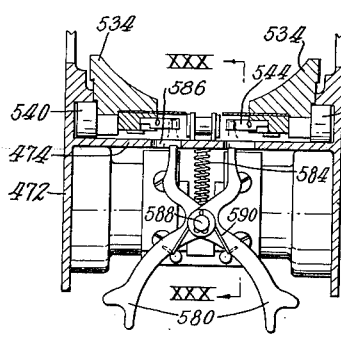
Fig. 29 is a section on the line XXIX—XXIX of Fig. 23.
Figure 30:
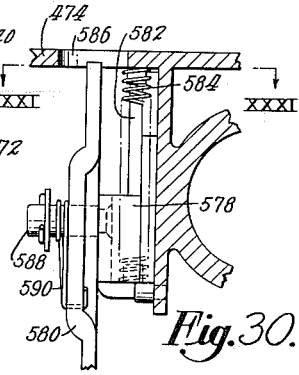
Fig. 30 is a section on the line XXX—XXX of Fig. 29.
Figure 31:
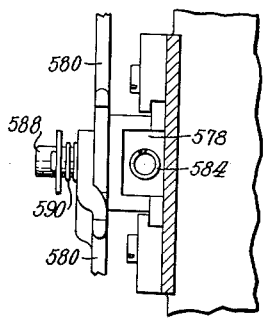
Fig. 31 is a section on the line XXXI—XXXI of Fig. 30.

Provision is made for removing the carriage from the transfer tray mechanism when the carriage is in its rearward position thereby to facilitate removal of a shell from the tray if desired. In order to effect the removal of the carriage, the latches 544 must be moved against the action of the springs 550 (Fig. 23) out of engagement with the lugs 542 on the chain 516, whereupon there is nothing to prevent rearward movement of the carriage and its removal from the tray. For thus moving the latches 544 the mechanism best shown in Figs. 29 to 31 is provided. Carried by a vertically movable slide 578 supported on the under side of the tray near its rearward end is a pair of arms 580. The slide 578 is guided for vertical movement on a rod 582 and is normally held in its down position by a spring 584 in which position the upper ends of the arms 580 are located below the partition 474 of the transfer tray but in register with a pair of holes 586. The arms 580 are pivoted at 588 to the slide 578 and a spring 590 acts on the arms to hold the lower ends apart whereby the upper ends are held adjacent to each other. Upon exerting an upward force on the lower ends of the arms 580 they are moved upwardly with the slide into a position in which the upper ends of the arms engage the inner edges of the latches 544 rearwardly of the pivots 546, as shown in Fig. 23. If now the lower ends of the arms 580 are forced together, the upper ends are moved apart to force the latches out of engagement with the abutments 542 on the chain 516, whereupon the carriage may be readily withdrawn.

For steadying the rearward end of the shell after it is moved forwardly of the carriage 532, the opposite walls 472 of the transfer tray project upwardly at the forward end, as shown in Fig. 32, and carry inwardly extending plates 592 (Fig. 26) arranged to engage the flange of the shell as it moves forwardly of the carriage.

For clamping the forward end of the shell in the transfer tray during its downward movement, a pair of clamping plates 594 (Figs. 22, 23 and 26) are pivoted at 596 to the forward ends of the walls 472 of the tray. These plates, when in operative positions, engage the shell, as shown in Fig. 26, to clamp it against the supporting members 530. These plates are moved into the broken line positions, as indicated in Fig. 23, during the ramming operation to let the flange at the back end of the shell pass and are held in these broken line positions during return of the tray into its uppermost position to receive another shell from the magazine, thereby to avoid interference with the shell. After receiving the shell the plates are again closed so that the shell is firmly clamped within the tray. For thus moving the plates 594 they are provided with outwardly extending arms 598 to which are connected the forward ends of links 600, the rearward ends of which are connected to upwardly extending arms 602 carried by a shaft 604 (Figs. 23 and 24) journaled in bearings 606 formed in the walls 472 of the tray. The arm 602 at the right side of the gun has a pin-and-slot connection 608 (Fig. 22) with a rearwardly extending link 610 pivoted to a downwardly extending arm 612 carried by a pivot screw 614 supported in the side wall 472. The arm 612 extends below the pivot screw 614 and carries a short arm 616 held by a spring 618 in the position shown in Fig. 22. The arm 616 carries a cam roll 620 arranged to be engaged by a cam 622 at the upper end of the arm 478 by which the rearward end of the tray is carried. The arrangement is such that during the downward movement of the tray the plates 594 are not moved into their open positions by the cam 622 but are thus moved during the upward movement of the tray. During the downward movement the cam 622 by its engagement with the cam roll 620 moves the arm 616 in a clockwise direction stretching the spring 618 but imparting no motion through the links 610, 600 to the plates 594 by reason of a locking mechanism to be described. With the arm 478 in its down position, the cam clears the roll 620 which again moves into the position illustrated relatively to the lower end of the arm 612. Upon upward movement of the tray the cam acts upon the upper surface of the roll 620 exerting a downward force thereon to move the lever 612 in a counterclockwise direction, pulling the link 610 rearwardly against the force of a spring 624 and acting through the arm 602, shaft 604 and links 600 to move the plates 594 into their open positions.

For locking the plates in their operative positions during the downward movement of the tray, a cam 628 carried by the upper end of the arm 476 on the right side of the gun is provided. This cam cooperates with a cam roll 630 carried by the lower end of an arm 632 (Fig. 24) pivoted at 634 between a pair of brackets 636 carried by the lower end of the arm 602. A spring 638 acts between the lower end of the arm 602 and the arm 632 to maintain the arm normally in the position shown in Fig. 24 relatively to the arm 602 with the cam roll 630 in position to be acted upon by the periphery of the cam 628. Upon counterclockwise swinging movements of the arms 476, 478 (Fig. 22) to move the transfer tray rearwardly and downwardly the periphery of the cam 628 engages the roll 630 to lock the arm 602 in the position shown in Fig. 22 so that the plates 594 are prevented from moving out of their operative positions. When the transfer tray reaches its lowermost position the cam 628 is clear of the roll 630 so that the plates may open to permit ramming movement of the shell. As shown in Fig. 23, the upper end of the cam 628, as viewed in Fig. 22, is inclined outwardly and forwardly relatively to the transfer tray. Upon the beginning of the upward movement of the tray, following the ramming operation, this inclined portion of the cam 628 engages the outer face of the cam roll 630, moving the arm 632 in a clockwise direction, as viewed in Fig. 24, so that the cam roll is held against the adjacent face of the cam 628 and is not acted upon by the periphery of the cam. Consequently, the cam 622 (Fig. 22) is effective to act, through the mechanism heretofore described, to move the plates 594 into their open positions so that there is no interference with the movement of the tray into position to receive another shell from the magazine. As the transfer mechanism approaches its uppermost position the cam 622 clears the cam roll 620, as shown in Fig. 22, whereupon the springs 624, 640 move the plates 594 into locking engagement with the shell.

The chain 516, by which the shell is moved with respect to the transfer tray and is rammed into the gun, starts to operate when the tray has moved substantially half way from its uppermost to its lowermost position. This chain is driven from the gear 494 on the inner face of which is formed a cam groove 642 (Fig. 1) in which is received a roll 644 carried by a gear segment 646 pivoted at 648 to the plate 484. The gear segment 646 engages a pinion 650 carried by a shaft 652 journaled in bearings formed in the plate 484. The shaft on its inner end carries a gear 654 (Fig. 26) engageable with a gear 656 journaled on a shaft 655 concentric with and journaled within the shaft 514 supporting the arm 476. The gear 656 is connected through an idler gear 658 with a gear 660 formed on the outer end of a sleeve 662 (Fig. 23) journaled on a shaft 664 by which the arm 476 is connected to the transfer tray. The sleeve 662 is connected to another sleeve 666 having formed thereon a gear 668 engageable with a gear 670 journaled on the side wall of the tray, this gear meshing with a gear 672 secured to the shaft 524 (Fig. 32) carrying the front sprocket 520.

From the above it will be understood that at the completion of the fuse-setting operation and upon rotation of the cam shaft 154 (Fig. 1) the transfer tray starts its rearward and downward movement during which time the plates 594 are locked by the cam 628 (Fig. 22) in engagement with the shell, the rear end of which is held between the pawls 564 (Fig. 28) and the member 570 against lengthwise movement relatively to the chain 516. At the same time the flanges 538 on the plate 536 hold the rear end of the shell in position upon the carriage. The chain 516 starts to operate during the latter part of the downward movement of the transfer tray moving the carriage 532 forwardly until it engages the bumpers 554 (Fig. 23). The cam 628 now releases the plates 594 and the latches 544 are withdrawn to free the chain 516 from the carriage. The completion of the movement of the chain catapults the shell into the gun after which during the latter half of the movement of the cam shaft 154 the transfer tray returns to its uppermost position to receive another shell from the magazine. During this time the plates 594 are locked open by the cam 622 (Fig. 22) and the chain 516 returns to its original position, moving the carriage with it as heretofore described.

The gun loading mechanism is designed for high speed operation and the movements of the loading tray are effected in a small fraction of a second. For this reason it is necessary in order to avoid unnecessary vibration and to insure smoothness of operation that suitable buffing mechanisms be employed in connection with the transfer tray. For buffing the tray in its downward movement to carry a shell into ramming position, mechanism illustrated in Figs. 42 to 45 is provided. One of the rearward arms 478 by which the tray is carried has connected to it a chain 680 (Figs. 23, 25 and 42), the lower end of which is secured to a segment 682 pivoted on the adjacent supporting plate 484. The segment 682 is in turn connected by a chain 684 to a stem 686 of a piston 688 which is hollow and communicates by way of ports 690 with the interior of a cylinder 692. A compression spring 694 urges the piston 688 into the position illustrated but upon downward movement of the transfer tray the piston is moved to the right against the force of the spring 694. Seated within a recess in the head end of the piston is a bushing 696 which is fitted closely on a forwardly extending pin 698 which is generally circular in cross-section but has flattened cut-away portions 700, 702, 704 in its surface.

Movement of the piston 688 to the right, by reason of downward movement of the transfer tray, forces the fluid ahead of the piston through the apertures 690 whence it must flow between the pin 698 and the bushing 696. As noted in Fig. 43, the cut-away portions 700, 702, 704 are of different dimensions so as to provide passages of varying cross-sectional areas between the pin and the bushing 696 in accordance with the position of the piston therealong. These cut-away portions are so dimensioned as to provide the desired operating characteristics, the portions 702 being surrounded by the bushing 696 when the tray is traveling at its maximum speed thereby providing the smallest passageway and the greatest buffing action. For providing sufficient fluid to maintain the cylinder 692 filled at all times the left end of the cylinder is connected by way of passageways 706, 708 to a tank or reservoir 710. The tank is also connected by a pipe 712 to the right end of the cylinder by way of a check valve not disclosed herein but which is similar to that illustrated in connection with the buffing mechanism operative when the loading tray is returning to its shell-receiving position and which is described in detail below.

Figure 36:
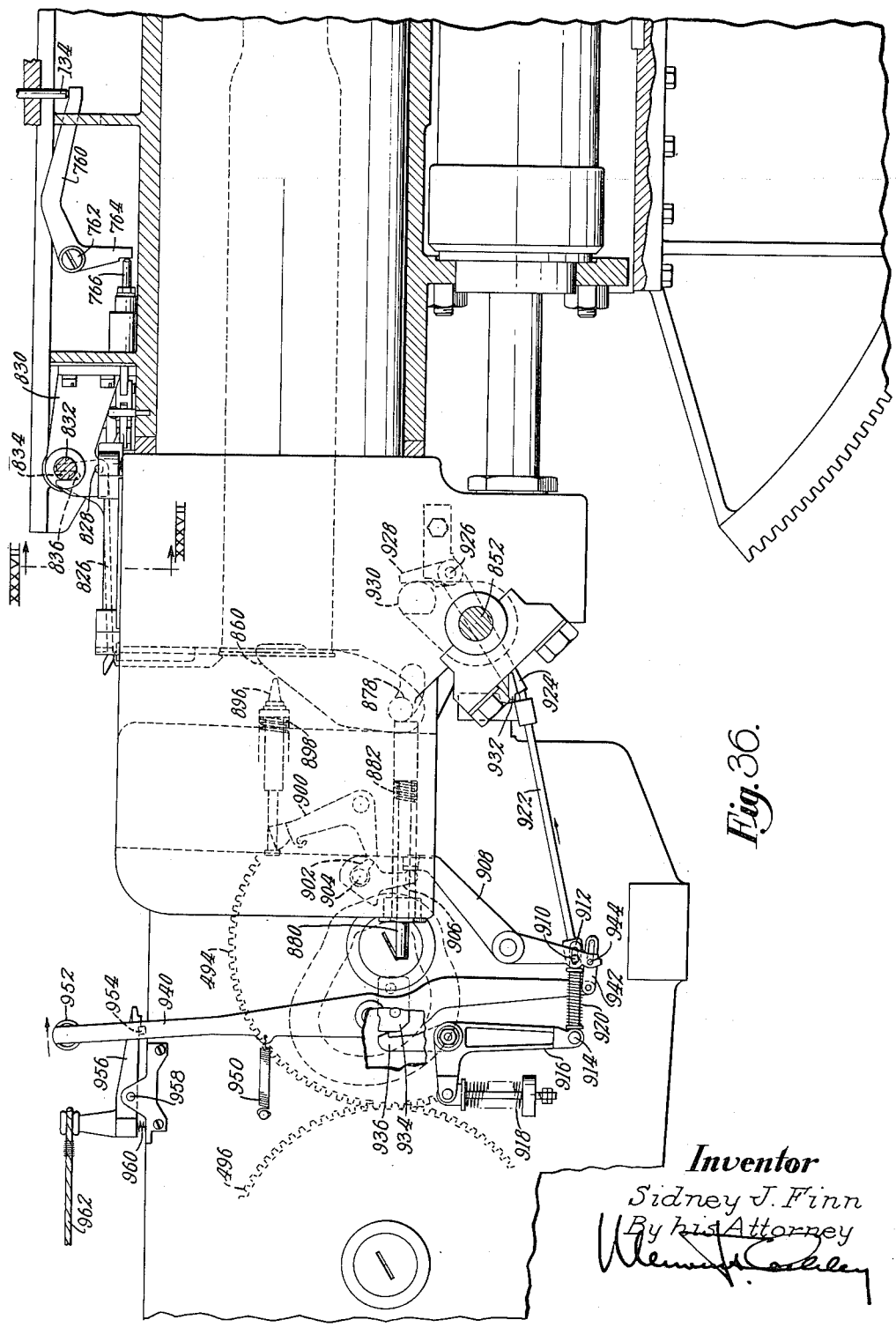
Fig. 36 is a right side elevation partly in section of the breech end of the gun showing a portion of the safety mechanisms associated therewith for preventing malfunctioning of the apparatus.
Figure 46:
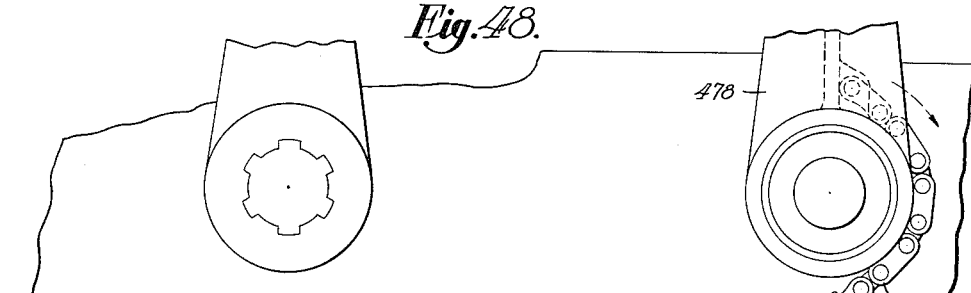
Fig. 46 is a side elevation of the mechanism for buffing the loading mechanism in its upward movement.
Figure 47:
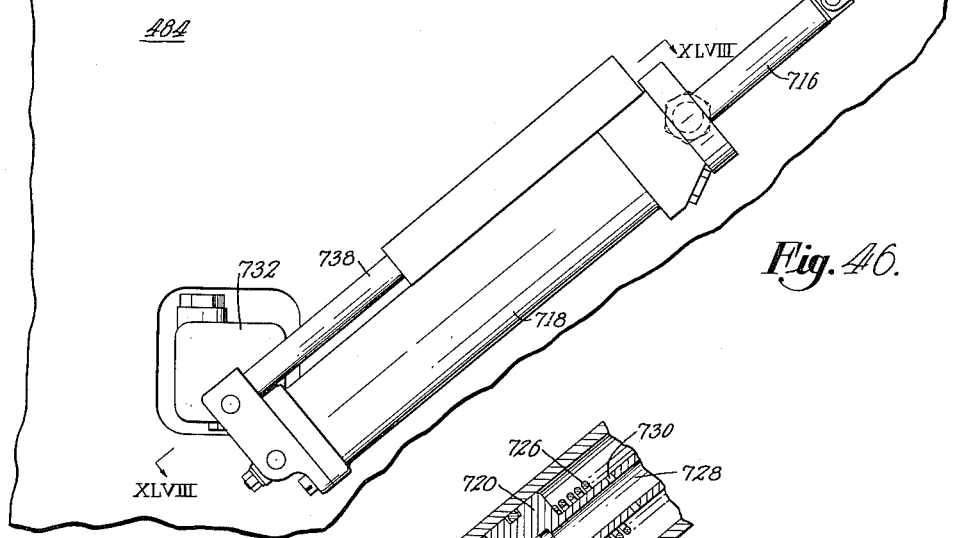
Fig. 47 is a vertical section through the rear end of the buffing cylinder of Fig. 46.

This buffing mechanism is similar in principle to that shown in Figs. 42 to 45 and includes a chain 714 (Fig. 46) connected to the other arm 478 at its upper end and at its lower end to a rod 716 extending outwardly of a cylinder 718 from a piston 720. The head end of this piston carries a bushing 722 having a sliding fit on a pin 724 which has cut-away portions 725 providing passageways of variable cross-section between the bushing and the pin. The piston 720 is urged downwardly by a spring 726 and communication between the forward and rearward ends of the piston is provided by a passagebound. For holding the latch in its lowermost position with the gun in battery against the action of the spring 818, a heavy leaf spring 826 (Figs. 33 and 34) is provided. The back end of the spring engages the upper surface of the plug 822 which is convexly curved, as shown in Fig. 34, thereby to cam the spring upwardly in response to the return of the gun to battery. The spring 826 is carried by a pin 828 (Fig. 36) carried by a bracket 830 secured to the gun carriage. Journaled in the bracket 830 and in a side wall of the carriage is a shaft 832 carrying an eccentrically disposed pin 834 received in a slot 836 in an upwardly extending arm of the spring 826. It will be apparent that with the shaft 832 positioned as shown in Fig. 36 the spring 826 is held in the position shown in which it maintains the latch 814 in its locking position with the gun in battery while permitting the latch to move upwardly under the impact of the shell in the ramming operation. If, however, the shaft 832 is turned, the spring 826 is lifted out of engagement with the plug 822 in the latch 814 whereupon the relatively light spring 818 lifts the latch out of locking position. The purpose of this is to permit removal of a shell from the gun if desired at any time. Upon firing, the gun recoils whereupon the latch moves out of operative relation with the heavy spring 826 and is moved upwardly by the spring 818 to permit ejection of the shell.

For moving the shaft 832 to cause upward movement of the spring 826, the shaft is operatively connected to mechanism by which the breechblock of the gun is manually opened. For this purpose the shaft 832 carries an arm 838 (Fig. 41) connected by a link 840 to the forward end of a lever 842 pivoted at 844 on one of the side plates 484. The rearward end of the lever 842 is formed with a curved slot 846 which receives a pin 848 carried by an arm 850 journaled on a breech-operating crank shaft 852 similar to that illustrated and described in Letters Patent of the United States No. 2,613,576, granted October 14, 1952, on an application filed in my name. With the breechblock closed a lug 854 carried by the crank shaft 852 is in engagement with a lug 856 on the arm 850. Consequently, upon moving the arm 850 in a counterclockwise direction, the crank shaft 852 is rotated in a counterclockwise direction thereby to lower the breechblock against the action of a heavy compression spring 858 operatively connected to the crank shaft. This movement of the arm 850 causes the lever 842 to move in a clockwise direction about the pin 844, pulling the link 840 downwardly and turning the shaft 832 in a counterclockwise direction. Consequently, the pin 834 carried by the shaft acts to move the spring 826 about the pivot 828 and lift the rearward end of the spring, whereupon the latch 814 (Fig. 34) moves upwardly to permit release of the shell from the breech.

Figure 41:
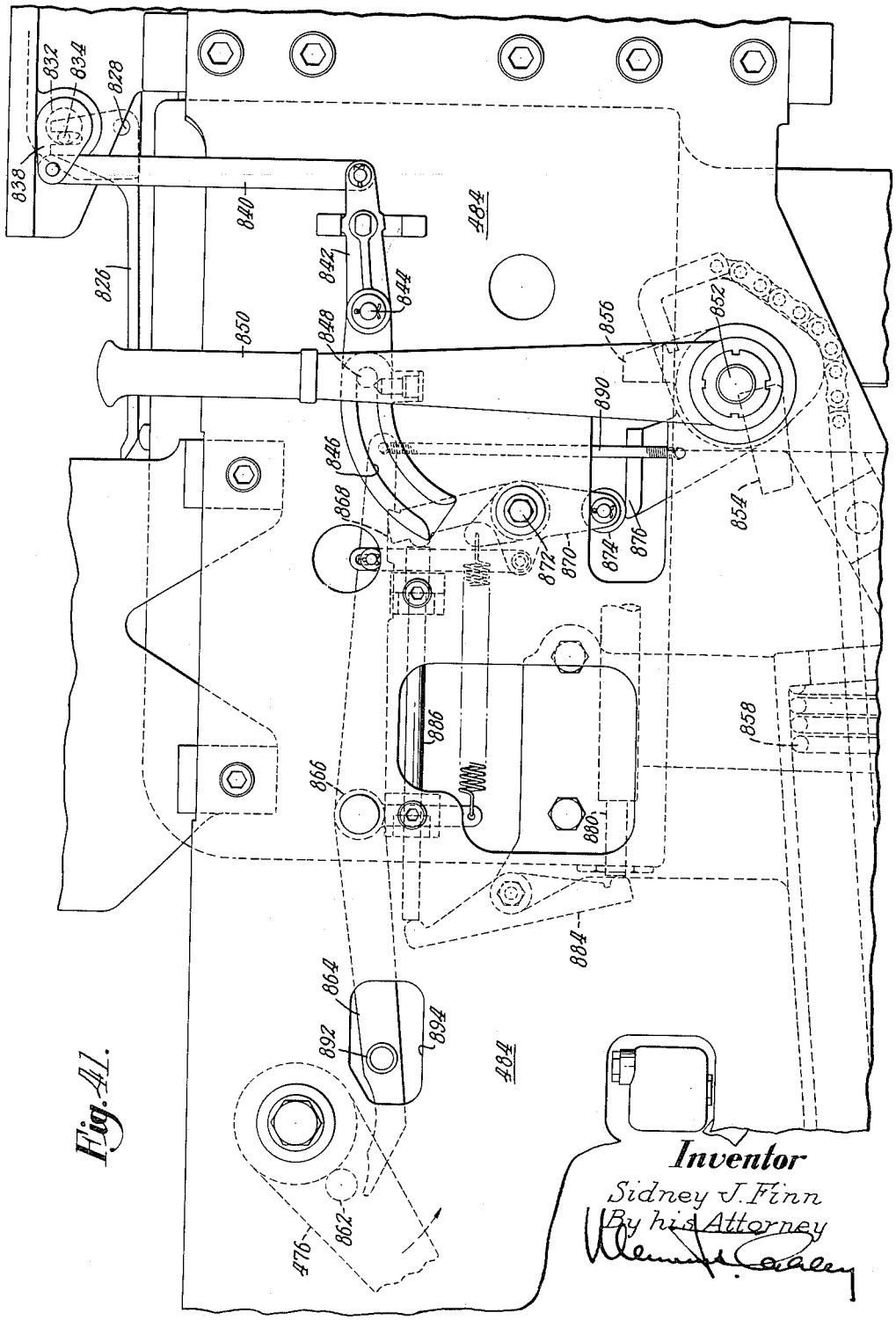
Fig. 41 is a side elevation of the breech end of the gun illustrating the positions of the parts just prior to loading of the gun.
Figure 42:
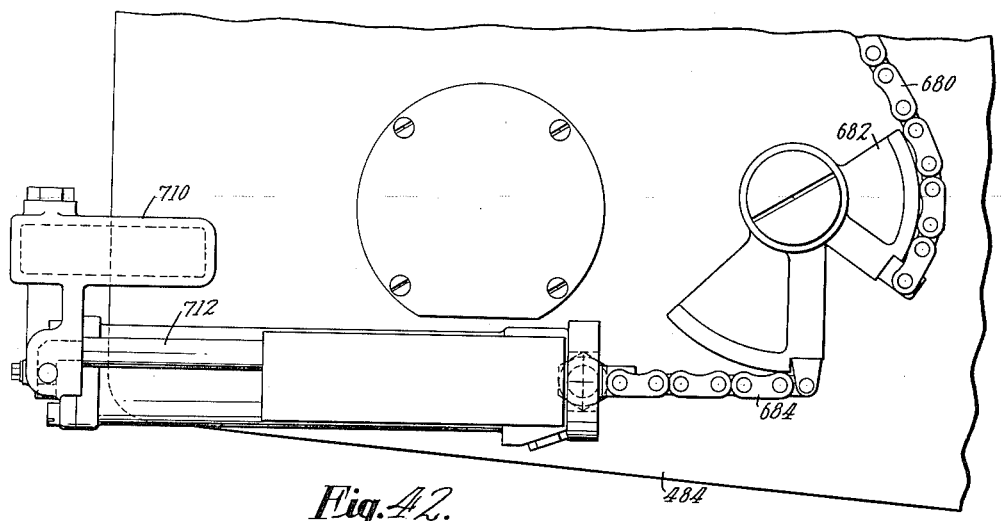
Fig. 42 is a side elevation of the mechanism for buffing the loading mechanism in its downward movement.
Figure 43:
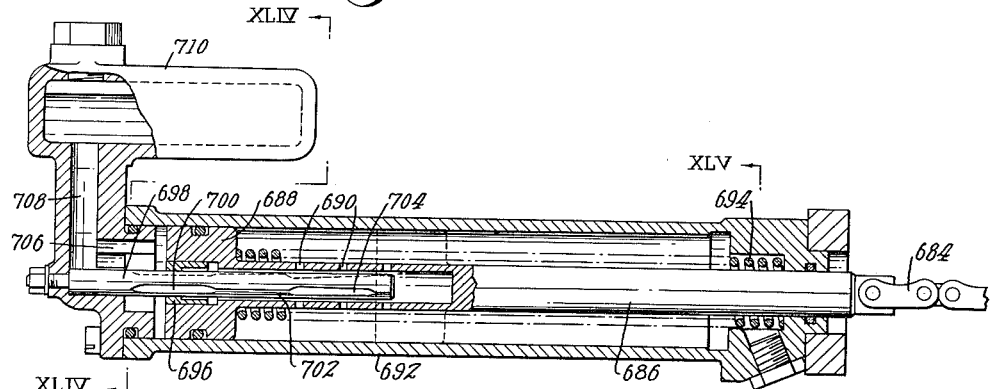
Fig. 43 is a vertical section through the buffing cylinder of Fig. 42.
Figure 44:
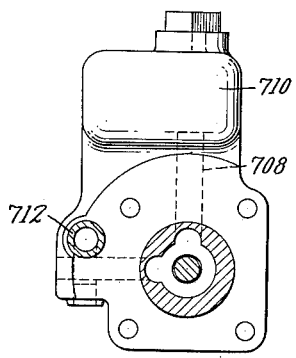
Fig. 44 is a section on the line XLIV—XLIV of Fig. 43.
Figure 45:
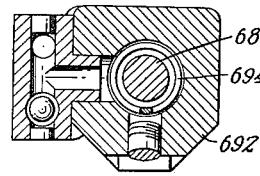
Fig. 45 is a section on the line XLV—XLV of Fig. 43.

As is customary in breech mechanisms of the type employed in 3″ .50 caliber naval guns, and as disclosed in the aforementioned patent, the breechblock is automatically closed by action of the spring 858 in turning the crank shaft 852 when the rim of the shell case strikes the extractor fingers, one of which is indicated by broken lines at 860 (Fig. 36). Because of the possibility of the extractor fingers moving prematurely under vibrations set up during operation of the loading mechanism, an interlocking mechanism is provided to insure against this danger and consequent premature closure of the breechblock. As shown in Fig. 41, one of the arms 476 by which the transfer tray is supported carries a pin 862 which engages the rearward end of a lever 864, moving it in a counterclockwise direction about a pivot 866 when the tray reaches its ramming position. The forward end of the lever 864 is recessed at 868 and engages the upper end of a holddown lever 870 pivoted at 872 and carrying at its lower end a roll 874. With the breechblock in open position, the roll 874 rests on the upper surface of a stop arm 876 carried by the crank shaft 852 thereby to prevent closure of the breechblock. This holddown lever is moved in a clockwise direction by the extractor fingers when they are in turn moved into the position shown in Fig. 36 by the engagement of the flange at the rear end of the shell casing in the ramming movement, providing the lever 864 has been previously moved out of locking engagement with the upper end of the holddown lever 870. The extractor fingers have outwardly extending trunnions 878, one of which engages the forward end of a pin 880 urged forwardly under the influence of a spring 882. The rearward end of the pin 880 engages the lower end of a lever 884 (Fig. 41), the upper end of which engages a pin 886 so that the rearward movement of the pin 880 causes a forward movement of the pin 886 and by reason of its engagement with the upper end of the holddown lever 870 moves this lever in a clockwise direction thereby moving the roll 874 off the arm 876 to permit closure of the breechblock. A spring 890 normally maintains the forward end of the lever 864 in locking engagement with the upper end of the holddown lever 870.

In the event that it is desired manually to load the gun without operating the loading mechanism, the lever 864 must be moved to release the holddown lever 870 so that this lever will be capable of movement when the extractor fingers are engaged by the shell. Accordingly, the lever 864 is provided with a handle 892 which projects through an opening 894 in the plate 484 whereby it is accessible to the operator.

The breechblock is provided with the usual firing pin 896 (Fig. 36) which is retracted against the action of a compression spring 898, in response to upward movement of the breechblock, by a cocking lever 900 upon its engagement with a sear 902. This sear is carried by a shaft 904 arranged to be moved in a counterclockwise direction when the breechblock is closed and the loading tray is in its uppermost position thereby to permit the firing pin to fly forward under the action of the spring 898 thereby to fire the gun. For thus moving the shaft 904 it carries a downwardly extending arm 906 arranged to be engaged by the upper end of a lever 908, the lower end of which carries a pin 910. Slidable on this pin is the forward end of an arm 912 the rearward end of which is pivoted at 914 to a lever 916 urged for movement in a clockwise direction by a spring 918. A spring 920 surrounds the arm 912 and is arranged upon movement of the lever 916 in a counterclockwise direction to transmit motion to the lever 908 providing it is not otherwise locked against movement should conditions be such that the gun is not ready to be fired. For example, if the breechblock is not fully closed, the lever 908 is held against movement by a rod 922 pivoted to the lower end of the lever 908, its forward end being engaged by a lever 924. This lever is pivoted at 926 to the breech ring of the gun and has an upwardly extending arm 928 arranged to be engaged by a crank 930 carried by the shaft 852 thereby to rock the lever 924 in a clockwise direction into the position illustrated in Fig. 36 when the breechblock is fully closed. This permits the rod 922 to move from its engagement with a projection 932 on the lower end of the lever 924 into the position illustrated so that the lever 908 may be moved in a counterclockwise direction upon movement of the lever 916 in a counterclockwise direction against the action of the spring 918.

For thus moving the lever 916 the gear 494, by which the loading mechanism is operated, carries a cam block 934 arranged to engage an arm 936 extending upwardly from the lever 916 so as to move the arm rearwardly and release the firing pin by the mechanism heretofore described after the transfer tray has returned to its shell-receiving position.

Figure 48:
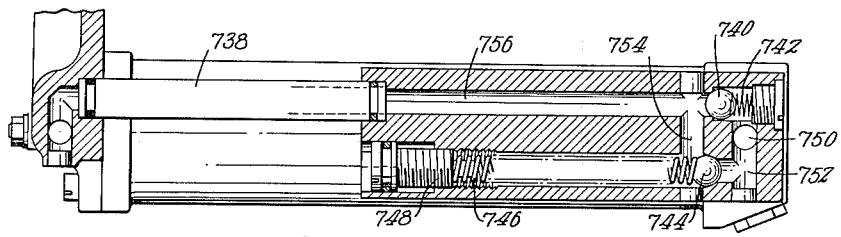
Fig. 48 is a section on the line XLVIII—XLVIII of Fig. 46.

It may be desirable to prevent operation of the firing mechanism after the gun is loaded and for this purpose a lever 940 is provided carrying at its lower end a slotted link 942 extending forwardly and embracing a pin 944 carried by the lower end of the lever 908. The lever 940 way 728 and ports 730. A tank 732 is connected by passageways 734, 736 to the lower end of the cylinder 718 and by a pipe 738 to the upper end of the cylinder by way of a check valve 740. This check valve is held against its seat by a light spring 742 and permits the flow of fluid thereby when the piston 720 is moving downwardly under the influence of spring 726 in response to downward movement of the transfer tray, thereby to maintain the space ahead of the piston filled with fluid. In addition to the passageways between the bushing 722 and the pin 724, an additional passageway is provided for the fluid in the upper end of the cylinder under the control of a check valve 744 (Fig. 48). This check valve is held against its seat by a heavy compression spring 746, the effectiveness of which is controlled by an adjusting screw 748 against which it reacts. During the upward movement of the loading tray fluid is forced from the cylinder at its upper end through passageways 750, 752, check valve 744 and passageways 754, 756 into the pipe 738. The conjoint action of the check valve 744 and the movement of the piston 720 along the pin 724 provides the required buffing action throughout the upward movement of the transfer tray, in accordance with the velocity of the tray at different points in its upward movement. Variations in the buffing action are made possible by the adjustment of the spring 746 acting on the check valve 744. A similar arrangement of check valves is provided in connection with the buffer of Figs. 42 to 45 which is effective during downward movement of the tray.

Reference has been made to certain conditions which make it inadvisable to operate the clutch 132 (Figs. 2 and 40) which controls the loading of the gun. This clutch is rendered inoperative if the stop arm 136 is in alinement with the pin 124, which condition exists in the event that the gun is not in battery or in the event that the previously fired shell has not been ejected completely from the gun. The position of the stop arm 136 is controlled by the rod 134 which is acted upon by a bell-crank lever 760 (Fig. 36) pivoted at 762 in the gun carriage above the breech end of the gun tube. The bell-crank lever 760 has a downwardly extending arm 764 in the path of movement of a pin 766 carried by a tube 768 (Fig. 35) slidable in a sleeve 770 mounted in the gun carriage. Slidable in the rearward end of the tube is a plunger 772 having a pin-and-slot connection 774 with the tube 768 and urged rearwardly of the tube by a spring 776. The tube 768 has a downwardly extending portion 778 which is connected by a pair of toggle links 780, 782 with the sleeve 770. The plunger 772 is in the path of movement of the breech ring of the gun and is engaged thereby when the gun moves into battery position. With the toggle links 780 and 782 straightened, as shown in Fig. 35, the tube 768 is locked against forward movement of the sleeve 770 and engagement of the plunger 772 by the breech ring of the gun will merely compress the spring 776 without imparting any movement to the tube 768 and the pin 766. In the event that the shell case of a previously fired shell has not been properly ejected from the gun, the toggle links 780 and 782 are maintained by a spring 784 in their straightened position so that the pin 766 is ineffective to operate the bell-crank lever 760 and to move the stop arm 136 out of register with the pin 124 (Fig. 40).

If, however, the empty shell case has been properly ejected from the gun, the toggle links 780, 782 are broken and engagement of the plunger 772 by the breech ring of the gun will cause forward movement of the tube 768 so that the stop arm 136 is moved out of register with the pin 124 and the clutch which controls operation of the loading mechanism is engaged. For thus breaking the toggle links the breech ring of the gun carries a rock-shaft 786 (Fig. 33) the forward end of which carries an arm 788. The outer end of this arm is arranged to engage an arm 790 of the toggle link 780 upon return movement of the gun to battery in the event that the breech is clear. This will cause movement of the toggle links into the positions shown in Fig. 33 against the action of the spring 784. The rearward end of the rock-shaft 786 carries a downwardly extending arm 792 which, as illustrated in Fig. 25, has an end portion arranged to rest against the shell case if it is still within the breech of the gun. The arm is urged into engagement with the shell case by a spring 794 (Fig. 37) which acts between an arm 796 extending laterally from the shaft 786 and the breech ring of the gun. With the breech of the gun clear the spring moves the rockshaft 786 to carry the arm 788 into the position shown in Fig. 37 in which it is engageable with the arm 790 of the toggle link 780 upon return of the gun to battery, whereupon, through the mechanism heretofore described, the clutch controlling the loading mechanism is permitted to engage. If, however, a shell remains in the breech of the gun the lower end of the arm 792 rests thereon, causing the arm 788 (Fig. 37) to assume the broken line position. When in this position the outer end of the arm which is recessed at 798 rides over the arm 790 of the toggle link 780 whereupon the toggle is not broken and consequently return of the gun to battery does not act to engage the clutch.

As shown in Fig. 38, the upper end of the arm 788 has an inclined surface 800 arranged when the arm is in its upper position, caused by the presence of a shell case in the breech end of the gun, to engage the button 802 of a normally closed switch 804 which is in the circuit to the solenoid 112 (Fig. 2) thereby to open the switch and to de-energize the solenoid.

Figure 8:
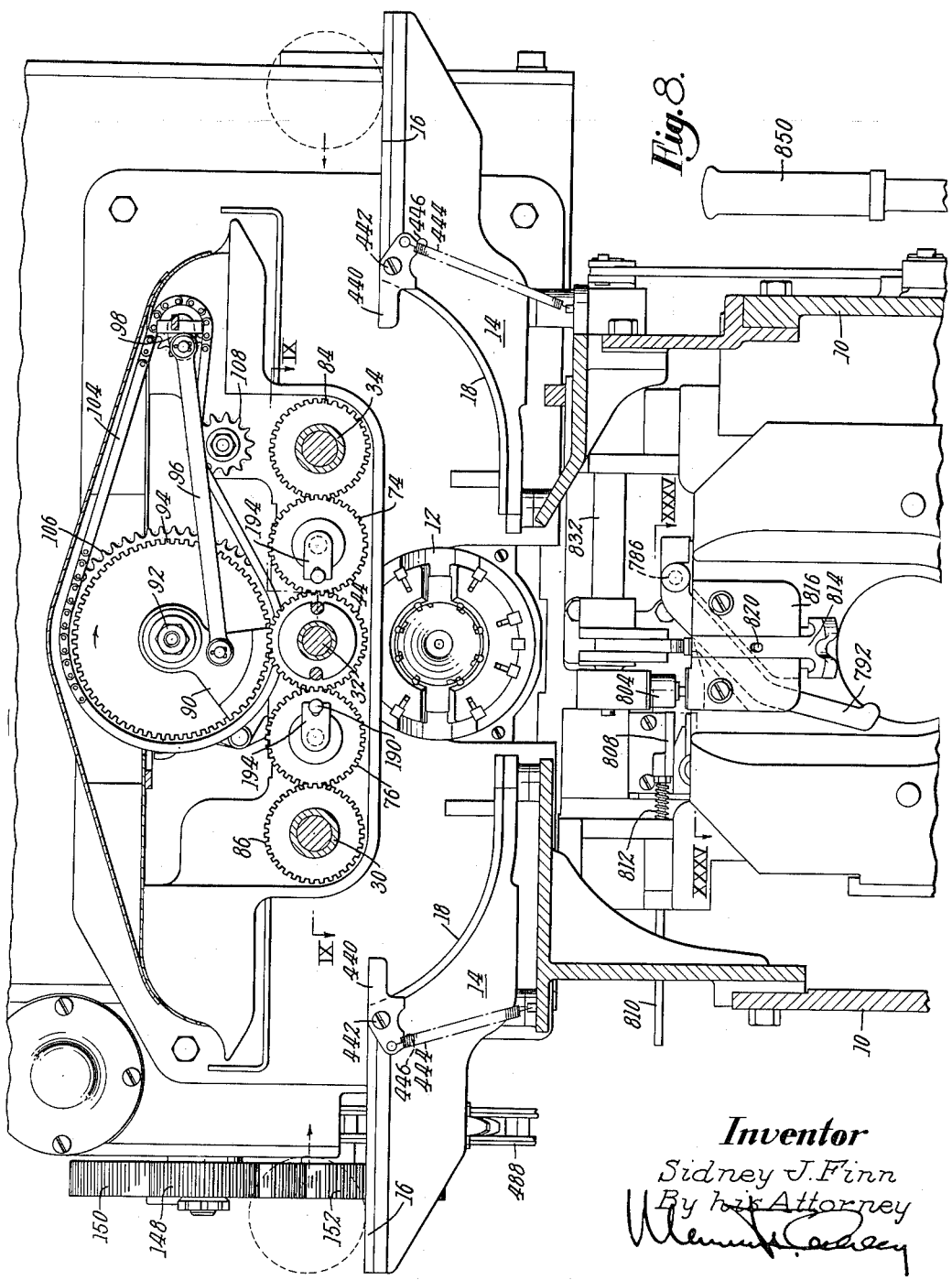
Fig. 8 is a section on the line VIII—VIII of Fig. 3.

In order to permit operation of the loading mechanism, following return of the gun to battery with an empty shell case therein, after the shell case has been subsequently removed by the operator, provision must be made to break the toggle links 780, 782 to permit re-engagement of the clutch. For this purpose the toggle links are connected by a pin 806 (Fig. 33) which extends upwardly in position to be engaged by a strap 808 carried by a rod 810 extending through a wall of the gun carriage, there being a spring 812 holding the strap in the position shown in Fig. 33 in which movement of the pin 806 is unimpeded. The rod 810 extends outwardly, as shown in Fig. 8, for easy access by the operator whereupon, if it becomes necessary manually to remove an empty shell case following return of the gun to battery, the rod 810 may be moved outwardly exerting a force on the pin 806 against the action of the spring 784 to break the toggle links. This permits the spring 776 (Fig. 35) to force the pin 766 forwardly, thus moving the stop arm 136 (Fig. 40) out of engagement with the pin 124 and permitting engagement of the clutch and operation of the loading mechanism. This breaking of the toggle link permits downward movement of the arm 788 (Fig. 33) which heretofore has been resting on the arm 790, permitting closure of the switch 804 and resumption of the cycle of operations of the loading mechanism.

In view of the speed with which the shells are loaded into the gun, provision is made for latching the shell therein and preventing rebound thereof which would interfere with closure of the breechblock. For this purpose a latch 814 (Figs. 25, 33 and 34) is mounted for vertical movement in the back end of the breech ring of the gun. The latch is guided in its vertical movements in a T-slot formed in a support 816 (Fig. 33) and is urged upwardly by a spring 818 acting between a pin 820 carried by the support and a plug 822 secured by a pin in the upper end of the latch. The lower end of the latch has a cam surface 824 to permit upward movement of the latter against the action of a heavy spring, to be described, which maintains the latch in its lowermost position with the gun in battery. During the ramming of the shell the latch moves upwardly in response to engagement of the flange at the back end of the shell with the cam surface 824, after which it is snapped into the position shown in Fig. 34 in which it holds the shell against reis normally held in the position illustrated in Fig. 36 by a spring 950 but may be moved in a clockwise direction by the operator so that the pin 944 is engaged by the forward end of the link 942 thereby locking the lever 908 against movement in a counterclockwise direction. The upper end of the lever 940 is provided with a handle 952 to facilitate this movement and carries a lug 954 engageable with the forward end of a latch 956 pivoted at 958 to the gun carriage. A spring 960 urges the latch 956 into locking engagement with the lever 940. For moving the latch out of locking engagement with the lever when it is desired to fire the gun, a lanyard 962 is secured to an upwardly extending arm of the latch 956 so that the operator may at any time release the latch, whereupon the firing pin is released by the mechanism heretofore described, for forward movement.

From the above it will be seen that sufficient safety devices and interlocks are provided to prevent damage to the mechanism upon malfunctioning of any of the parts. Thus, should the empty shell case fail to be ejected from the gun, the clutch by which the loading mechanism is operated is prevented from engaging whereupon a new shell is not moved into loading position and rammed. The breechblock is positively locked in open position following firing of the gun in such manner that vibrations will not release the locking mechanism and permit the breechblock to close prematurely but the loading mechanism must be in its lowermost position before the breechblock can be closed. Furthermore, the breechblock must be closed and the loading mechanism in its uppermost position before firing of the gun can take place. Certain details of the breechblock and its actuating mechanism are not disclosed herein inasmuch as they form no part of the present invention and are well known. These details are illustrated in the abovementioned application Serial No. 565,876 to which reference may be had for a clearer understanding of this portion of the mechanism.

The shell magazine is not claimed herein but forms the basis of divisional application, Serial No. 7,195, filed February 9, 1948, in my name.

Having described my invention, what I claim as new and desire to secure by Letters Patent of the United States is:

1. Loading mechanism for a gun comprising a transfer tray, means for moving said tray to carry a shell into alinement with the gun, an endless chain support for the shell in the tray, a carriage carried by said chain for supporting the rearward end of the shell, means operative during movement of the tray for operating said chain thereby to move the shell relatively thereto toward the gun, means for disconnecting said carriage from the chain when the carriage approaches the end of the tray, and means carried by said chain for continuing the movement of the shell relatively to the tray thereby to catapult the shell into the gun.

2. Loading mechanism for a gun comprising a transfer tray, means for moving said tray to carry a shell into alinement with the gun and then to return the tray into a shell-receiving position, an endless chain support for the shell in the tray, a carriage carried by said chain for supporting the rearward end of the shell, means operated by said tray-moving means for operating said chain, means for disconnecting the carriage from the chain when the carriage approaches the forward end of the tray, means carried by the chain for continuing movement of the shell relatively to the tray to catapult it into the gun, and means operative during return movement of the tray for coupling the carriage to it.

3. Loading mechanism for a gun comprising a transfer tray, means for moving said tray to carry a shell into alinement with the bore of the gun, an endless chain support for the shell in the tray, a carriage carried by said chain for supporting the rearward end of the shell, said carriage having a vertical wall engageable with the back end of the shell and said chain having a latch engageable with the flange of the shell cooperating with said vertical wall to prevent lengthwise movement of the shell relatively to the chain, means for releasing said latch and disconnecting the carriage from the chain when said carriage approaches the end of the transfer tray, and means carried by the chain engageable with the rearward end of the shell for continuing movement of the shell relatively to the tray thereby to catapult the shell into the gun.

4. Mechanism for supplying ammunition to a gun comprising a transfer tray movable to carry a shell into alinement with the bore of the gun, sprockets carried at each end of the tray, a sprocket chain guided by said sprockets, a carriage connected to said chain for movement therewith and being arranged to support the rearward part of a shell, other shell-supporting means carried by said chain forwardly of said carriage, means for driving one of said sprockets during the latter part of the movement of the tray to move the shell lengthwise of the tray toward the gun, means for disconnecting said carriage from the chain during the latter part of the movement of the chain after the carriage has reached the forward end of the tray, and means for releasably holding the carriage at the forward end of the tray during the final movement of the chain.

5. In combination with a gun of the type having a breechblock which is closed automatically upon loading of the gun, loading mechanism comprising a transfer tray movable to carry a shell between shell-receiving and loading positions, means for thus moving said tray, means controlled by said tray for preventing closure of the breechblock until the tray has moved into its loading position, and means for rendering said last-named means ineffective thereby to permit manual loading of the gun with the tray in its shell-receiving position.

6. In combination, a gun, loading mechanism comprising a transfer tray movable between shell-receiving and loading positions, power-operated means for thus moving the tray, a clutch controlling the operation of said power-operated means, means for preventing engagement of said clutch, a member operated by said gun in response to its return to battery following a firing operation for rendering said last-named means ineffective, and means rendering said member ineffective if the breechblock is not open and the breech is not empty.

References Cited in the file of this patent

UNITED STATES PATENTS

| | | |
|---|---|---|
| 947,600 | Schneider | Jan. 25, 1910 |
| 1,307,639 | Redpath et al. | June 24, 1919 |
| 1,438,670 | Standish | Dec. 12, 1922 |
| 1,525,065 | Browning | Feb. 3, 1925 |
| 1,602,568 | Conlon | Oct. 12, 1926 |
| 1,674,370 | Methlin | June 19, 1928 |
| 1,753,850 | De Courseulles | Apr. 8, 1930 |
| 2,122,423 | Joyce | July 5, 1938 |
| 2,364,510 | Bertran et al. | Dec. 5, 1944 |
| 2,415,144 | Molins | Feb. 4, 1947 |
| 2,425,425 | Jorgensen | Aug. 12, 1947 |

FOREIGN PATENTS

| | | |
|---|---|---|
| 125,442 | Great Britain | Apr. 24, 1919 |